United States Patent
Murphy et al.

(10) Patent No.: US 11,972,281 B2
(45) Date of Patent: Apr. 30, 2024

(54) JUST IN TIME COMPILATION USING LINK TIME OPTIMIZATION

(71) Applicant: NVIDIA Corporation, Santa Clara, CA (US)

(72) Inventors: Michael Murphy, Newark, CA (US); Shelton George Dsouza, San Jose, CA (US); Shandeep Nagori, Pune (IN); Thibaut Lutz, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 233 days.

(21) Appl. No.: 17/688,797

(22) Filed: Mar. 7, 2022

(65) Prior Publication Data
US 2023/0281030 A1    Sep. 7, 2023

(51) Int. Cl.
*G06F 9/445* (2018.01)
*G06F 9/455* (2018.01)

(52) U.S. Cl.
CPC ........ *G06F 9/4552* (2013.01); *G06F 9/44521* (2013.01)

(58) Field of Classification Search
CPC .......................... G06F 9/4552; G06F 9/44521
See application file for complete search history.

(56) References Cited

U.S. PATENT DOCUMENTS

| | | | |
|---|---|---|---|
| 2007/0294679 A1* | 12/2007 | Bobrovsky | G06F 9/45516 717/146 |
| 2023/0061087 A1* | 3/2023 | Ferraro | G06F 8/451 |
| 2023/0325476 A1* | 10/2023 | Kurogome | G06F 21/14 713/190 |

* cited by examiner

*Primary Examiner* — Ziaul A Chowdhury
(74) *Attorney, Agent, or Firm* — Lowenstein Sandler LLP

(57) ABSTRACT

A first intermediate representation of a first portion of a source code implementing an application and a second intermediate representation of a second portion of the source code is received by a processing device. The first intermediate representation and the second intermediate representation is merged, at run-time, into a merged intermediate representation, wherein the first intermediate representation includes a reference to a function in the second intermediate representation. An execution flow transfer instruction within the merged intermediate representation is identified based on a run-time value of a parameter of the application. The execution flow transfer instruction references the function. A set of executable instructions implementing the function is identified within the merged intermediate representation. The execution flow transfer instruction is replaced with a copy of the set of executable instructions implementing the function.

20 Claims, 14 Drawing Sheets

US 11,972,281 B2

JUST IN TIME COMPILATION USING LINK TIME OPTIMIZATION

TECHNICAL FIELD

At least one embodiment pertains to performing just-in-time (e.g., at run-time) link-time optimization. For example, at run-time, merging multiple intermediate representations of source code into a merged intermediate representation containing at least one parameterized function and optimizing the merged intermediate representation based on a run-time value of the parametrized function according to various novel techniques described herein.

BACKGROUND

Typically, source code is first compiled and then linked to produce an executable before executing source code. In some instances, the source code may be optimized for better performance, or to be more efficient before producing an executable. Accordingly, the executable may run more rapidly and/or require fewer resources or power to operate once optimized.

DETAILED DESCRIPTION

Figure 1:
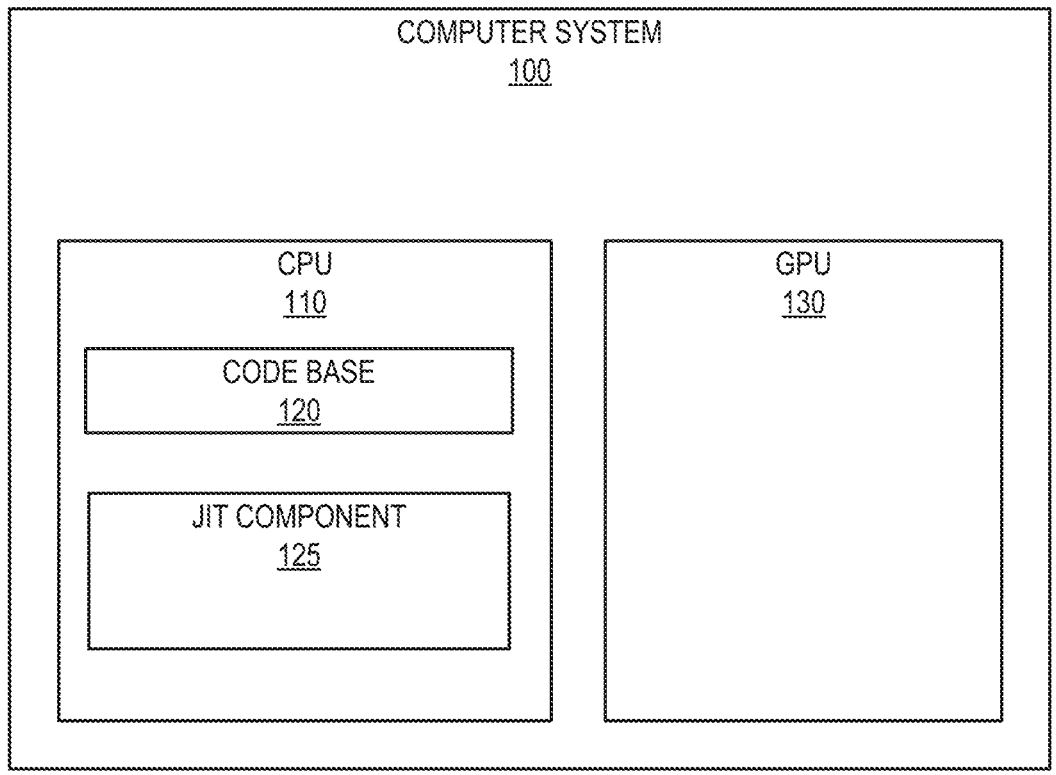
FIG. 1 illustrates an example of a computer architecture for performing just-in-time (JIT) link-time optimization (LTO), in accordance with at least one embodiment.

A codebase for an application may include multiple source code modules. Each source code module is created in a high-level language (e.g., Python, Java, C language), which may then be transformed (e.g., compiled) by a compiler to an intermediate representation (sometimes called "object module"). In the intermediate representation, high-level language constructs are represented by corresponding sequences of executable instructions which are compliant with the target instruction set architecture (ISA) (e.g., x86). A compiler resolves all local references (such as variable names and function entry points that are defined within the source code module being compiled) by translating each reference to corresponding relative addresses (e.g., an offset from the beginning of the intermediate module). However, an intermediate module can contain external references (such as variable names and function entry points that are not defined within the source code module being compiled), which cannot be resolved at the compile time, since the compiler only processes one module at a time.

The unresolved external references may then be resolved by a linker, which analyzes all intermediate modules for the given application and generates a single executable module. For example, the linker may locate an unresolved reference in a first intermediate representation module (e.g., a function call to a function, the implementation of which is not found in the first intermediate representation module) and locate the function body in a second intermediate representation module. Upon locating the function implementation in the second source file, the linker inserts the address of the entry point of the function into the function call in the first source code. The resulting executable module is ready to be loaded and executed. Loading an executable module involves the operating system kernel translating the relative addresses into corresponding absolute addresses in the process address space.

In some instances, compiling may involve performing certain optimization operations on the code being generated, e.g., in order to minimize the time of execution and/or the memory footprint of the corresponding intermediate module. In various illustrative examples, optimization operations may include, e.g., in-lining, dead (unreachable) code elimination, allocating frequently used local variables to processor registers, etc. For example, in-lining involves identifying an execution flow transfer instruction, such as a function call, and replacing the call instruction with the sequence of instructions implementing the function, thus avoiding the overhead of transferring the execution control to the called function. However, compile-time in-lining can only be performed with respect to local calls, i.e., calls to the functions that are defined within the source code module being compiled.

Cross-module in-lining may be performed by a linker implementing link-time-optimization (LTO). For example, the linker may identify an execution flow transfer instruction, such as a function call, and replace the call instruction with the sequence of instructions implementing the function, irrespective of whether the function is implemented within the same or different intermediate module. However, LTO may not account for execution flow transfers that are affected by run-time values of various application parameters (i.e., when the execution flow is conditionally transferred based on evaluating a run-time parameter).

Aspects of the present disclosure address the above and other deficiencies by providing techniques and methods for performing just-in-time link-time optimization (JIT LTO) to optimize executable code containing parameterized functions. In some implementations, the operating system (OS) kernel may load, into the memory mapped to the process address space, intermediate representations of multiple source code modules implementing an application, such that one of the intermediate representations includes a reference to a function that is defined in another intermediate representation. Upon merging the intermediate representations into a merged intermediate representation, the OS kernel may identify, within the merged intermediate representation, an execution flow transfer instruction referencing the function. The OS kernel may then inline the function call by identifying, within the intermediate merged representation, a set of executable instructions implementing the function and replacing the execution flow transfer instruction with a copy of the set of executable instructions implementing the function. In some implementations, the function to be called is determined based on a run-time value of an application parameter, and thus the in-lining operation would not be feasible before the run-time value of the application parameter becomes known.

Accordingly, aspects of the present disclosure minimize the execution time by performing run-time ("just-in-time) in-lining, thus avoiding the overhead that otherwise would be caused by execution flow controls.

FIG. 1 illustrates a computer system 100 that includes a CPU 110 and a GPU 130, in accordance with some embodiments of the present disclosure. The CPU 110 includes a codebase 120 developed for an application (e.g., CUDA application) to run on the CPU 110 and/or GPU 130. The codebase 120 may include multiple source code modules (e.g., source code files) developed in a high-level language (e.g., Python, Java, C language). The CPU 110 may transform (e.g., compile) the multiple source code modules of the codebase 120 by a compiler (not shown) of the GPU 130 to an intermediate representation (e.g., object module") for each source code module of the multiple source code modules. Accordingly, the CPU 110 may generate multiple intermediate representations corresponding to the multiple source code modules. In some embodiments, the CPU 110 may transform the multiple source code modules of the codebase 120 by a compiler (not shown) to the intermediate representation at compile-time. In some embodiments, the CPU 110 may transform the multiple source code modules of the codebase 120 by a compiler (not shown) to the intermediate representation at run-time.

The Just-In-Time (JIT) component 125 of the CPU 110 may receive the multiple intermediate representations generated by the compiler (not shown) of the CPU 110. The JIT component 125 may pass the multiple intermediate representations to a linker (not shown) to merge the multiple intermediate representations into a merged intermediate representation, which involves resolving previously unresolved external references. The linker may locate an unresolved reference in an intermediate representation module of the multiple intermediate representations (e.g., a function call to a function, the implementation of which is not found in the respective intermediate representation module) and locate the function body in another intermediate representation module of the multiple intermediate representations. Upon locating the function implementation in the other intermediate representation, the linker component inserts an address of the function's entry point into the function call in the respective intermediate representation. In some embodiments, a user may specify specific functions and variables to remain within the merged intermediate representation. Accordingly, the JIT component 125 may pass the specific functions and/or variables to the linker to determine which functions and/or variables to keep and those to remove during merging of the intermediate representations.

In some embodiments, the linker may return the merged intermediate representation back to the JIT component 125. Accordingly, the JIT component 125, at run-time, may pass the merged intermediate representation to a linker (and/or optimizer) to identify a function call (e.g., an execution flow transfer instruction) in the merged intermediate representation, which is performed conditionally, based on evaluating an application parameter at run-time. Accordingly, the JIT component 125 may pass the merged intermediate representation back to the linker to identify and/or receive a run-time value of the application parameter and thus identify the function to be called. The run-time value of the application parameter may be known at run-time via an application programming interface (API) exposed by the JIT component 125. The linker may then perform in-lining of the identified function, which involves identifying the sequence of executable instructions implementing the function and replacing the function call with a copy of the sequence of executable instructions. Once in-lining is completed, the linker may return the optimized merged intermediate representation back to the JIT component 125 to be executed on a device.

In some embodiments, the linker does not return the merged intermediate representation back to the JIT component 125. Accordingly, the JIT component 125 instructs the linker to, at run-time, identify a function call (e.g., an execution flow transfer instruction) in the merged intermediate representation, which is performed conditionally, based on evaluating an application parameter at run-time. Accordingly, the JIT component 125 may pass a run-time value of the application parameter to the linker to identify the function to be called. The run-time value of the application parameter may be known at run-time via an application programming interface (API) exposed by the JIT component 125. The linker may then perform in-lining of the identified function, which involves identifying the sequence of executable instructions implementing the function and replacing the function call with a copy of the sequence of executable instructions.

Alternatively, or additionally, the JIT component 125 may optimize executable code containing parameterized functions at run-time to be executed on GPU 130 or on another GPU (not shown). Alternatively, or additionally, the JIT component 125 may optimize executable code containing parameterized functions at run-time to be executed on an accelerator other than GPU 130, such as a field-programmable gate array (FPGA) of digital signal processor (DSP)). Embodiments are discussed herein with reference to performing, at run-time, merging and optimizing the multiple intermediate representation modules containing parameterized functions to generate an optimized executable code to be executed on a GPU. However, it should be understood that the same methods, techniques, and mechanisms described with reference to performing, at run-time, merging and optimizing of the multiple intermediate representation modules containing parameterized functions to generate an optimized executable code to be executed on a GPU also apply to perform, at run-time, merging and optimizing the multiple intermediate representation modules containing parameterized functions to generate an optimized executable code to be executed on a CPU (which may be a same or different CPU that performs, at run-time, merging and optimizing the multiple intermediate representation modules containing parameterized functions to generate an optimized executable code), an accelerator (e.g., an FPGA), and/or any other processor execute an optimized executable code. Thus, discussions herein regarding GPUs also apply to other types of processors, such as FPGAs and CPUs.

Figure 2:
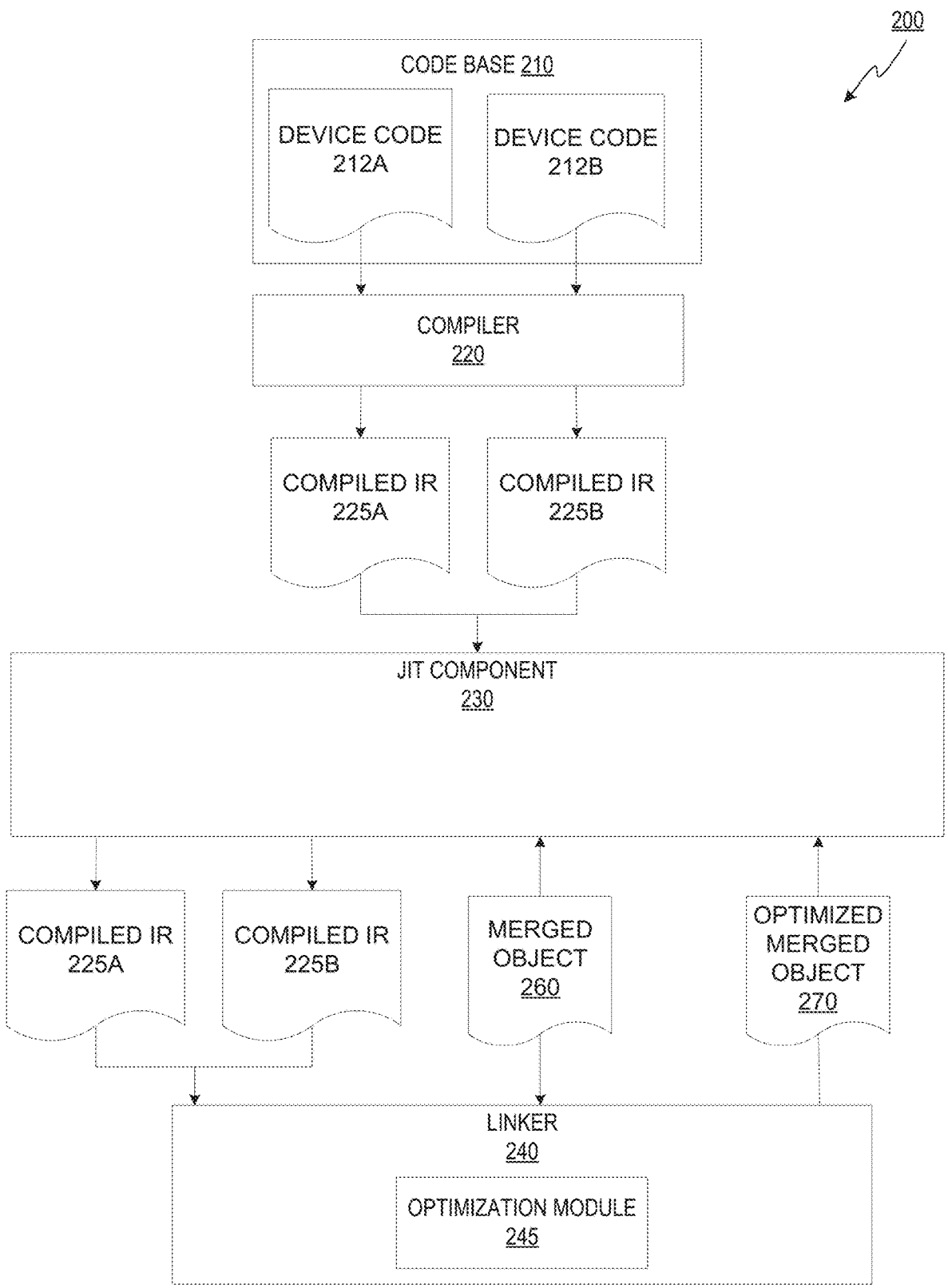
FIG. 2 illustrates performing JIT LTO, in accordance with at least one embodiment.

FIG. 2 is a sequence diagram illustrating an example of a computer system performing JIT LTO in accordance with at least one embodiment. Computer system 200 may include a codebase 210 containing device (e.g., GPU) codes 212A and 212B. Device codes 212A and 212B are compiled by compiler 220 of the computer system 220 to generate compiled intermediate representation module (e.g., IR). As previously described, compiler 220 may transform (e.g., compile) only device code one at a time by resolving all local references (such as variable names and function entry points that are defined within the source code module being compiled) by translating each reference to a corresponding relative addresses. For example, compiler 220 compiles device code 212A to a compiled IR 225A and device code 212B to a compiled IR 225B. Compiled IR 225A and 225B are submitted to the JIT component 230 (e.g., similar to the JIT component 125 of FIG. 1).

The JIT component 230 may receive the compiled IR 225A and 225B from the compiler 220. In some embodiments, the JIT component 230 may receive the compiled IR 225A and 225B from a user. The JIT component 230 may pass the compiled IR 225A and 225B to a linker 240 to merge the multiple intermediate representation modules into a merged intermediate representation module (e.g., merged IR optimization module 245), at run-time. Thus, the linker 240, combines the compiled IR 225A and the compiled IR 225B to generate a merged IR (e.g., merged object 260). As previously described, merging multiple intermediate representation modules includes identifying a function call (e.g., an execution flow transfer instruction) in a first compiled IR (e.g., compiled IR 225A) and replacing the function call with a body of the function associated with the function call (e.g., the sequence of instructions implementing the function) located within a second compiled IR (e.g., compiled IR 225B). Upon locating the function's body in the compiled IR 225B, the linker component inserts an address of the entry point of the body of the function into the function call in the compiled IR 225A.

Once the merged object is generated by the linker 240, the linker 240 passes the merged object to the JIT component 230 to cache the merged object. Accordingly, the JIT component 230 passes the merged object 260 to an optimization module 245 of the linker 240 to perform optimization operations on the merged IR. Accordingly, based on the run-time value, the optimization module 245 may identify the function to be called and replace the function call with a body of the function associated with the function call. Upon replacing the function call with a body of the function associated with the function call (e.g., optimizing the merged IR), the optimization module 245 generates an optimized merged object 270 (e.g., lower level machine code of the device) to be loaded and executed by the device. In some embodiments, the optimized merged object 270 may be passed by the linker 240 to the JIT component 230 to be passed to the user or the device to be loaded and executed. In other embodiments, the JIT component 230 may cause the linker 240 to pass the optimized merged object 270 to the user or the device to be loaded and executed.

In some embodiments, the linker may not pass the merged object to the JIT component 230. Accordingly, the JIT component 230 may pass the merged object to the linker 240 to identify, at run-time, a function call that is performed conditionally, based on evaluating an application parameter based on a run-time value to determine a corresponding function. In some embodiments, the JIT component 230 may provide the linker 240 one or more run-time values to assist in identifying the corresponding functions. Accordingly, based on the run-time value(s), the optimization module 245 may identify the function to be called and replace the function call with a body of the function associated with the function call. Upon replacing the function call with a body of the function associated with the function call (e.g., optimizing the merged IR), the optimization module 245 generates an optimized merged object 270 (e.g., lower level machine code of the device) to be loaded and executed by the device. In some embodiments, the optimized merged object 270 may be passed by the linker 240 to the JIT component 230 to be passed to the user or the device to be loaded and executed. In other embodiments, the JIT component 230 may cause the linker 240 to pass the optimized merged object 270 to the user or the device to be loaded and executed.

Figure 3:
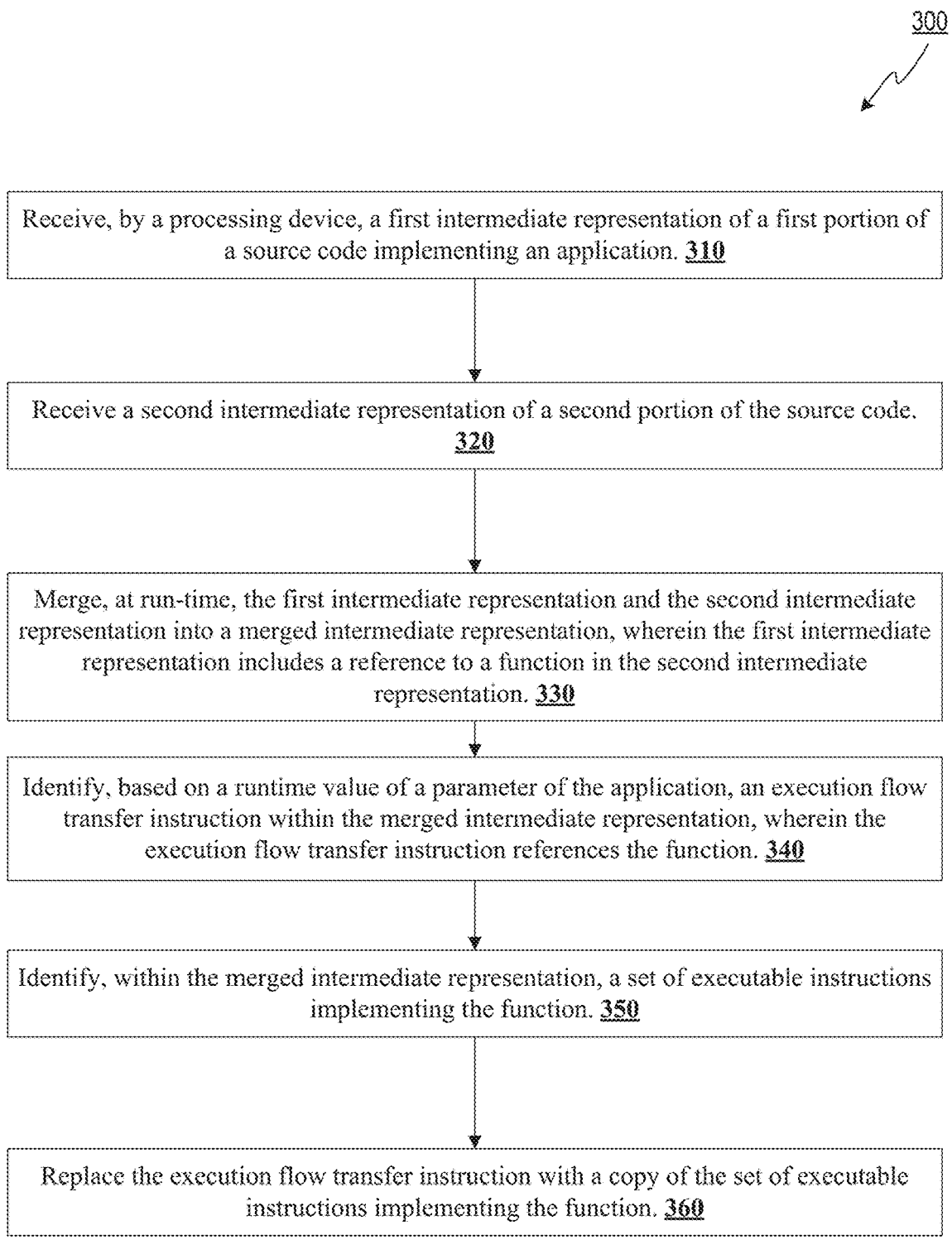
FIG. 3 is a flow diagram of a method of performing JIT LTO, in accordance with at least one embodiment.

FIG. 3 illustrates a flow diagram of a method 300 of performing link-time optimization at run-time, in accordance with at least one embodiment. Method 300 can be performed by processing logic that can include a hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by the execution management component 115 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

Referring to FIG. 3, at block 310, the processing logic receives, by a processing device, a first intermediate representation of a first portion of a source code implementing an application. At block 320, the processing logic receives a second intermediate representation of a second portion of the source code. In some embodiments, the first intermediate representation and/or the second intermediate representation may be generated by a compiler at compile time. As previously described, the processing logic may transform the first portion and second portion of the source code by a compiler to the first and second intermediate representation at compile-time. In some embodiments, when receiving the first intermediate representation and the second intermediate representation, the processing logic stores the first intermediate representation and the second intermediate representation in the processing device.

In yet another embodiment, the first intermediate representation and/or the second intermediate representation may be generated by a compiler, prior to merging, at run-time. As previously described, the processing logic may transform the first portion and second portion of the source code by a compiler to the first and second intermediate representation at run-time.

At block 330, the processing logic merges, at run-time, the first intermediate representation and the second intermediate representation into a merged intermediate representation, wherein the first intermediate representation includes a reference to a function in the second intermediate representation. As previously described, the processing logic locates unresolved references in an intermediate representation module (e.g., first intermediate representation) of the multiple intermediate representations (e.g., a function call to a function, the implementation of which is not found in the respective intermediate representation module) and locate the function body in another intermediate representation module (e.g., second intermediate representation) of the multiple intermediate representations. Upon locating the function implementation in the other intermediate representation, the linker component inserts an address of the function's entry point into the function call in the respective intermediate representation.

At block 340, the processing logic identifies, based on a run-time value of a parameter of the application, an execution flow transfer instruction within the merged intermediate representation, wherein the execution flow transfer instruction references the function. As previously described, the function may be determined based on a run-time value of an application parameter. Depending on the embodiment, the processing device may include an application programming interface (API). As previously described, the run-time value of the application parameter may be known at run-time via an application programming interface (API) exposed by the linker.

At block 350, the processing logic identifies, within the merged intermediate representation, a set of executable instructions implementing the function. As previously described, the set of executable instructions implementing the function associated with the function determined by the run-time value of the application parameter. At block 360, the processing logic replaces the execution flow transfer instruction with a copy of the set of executable instructions implementing the function.

Depending on the embodiment, the processing logic executes the merged intermediate representation on the device. In some embodiments, to execute the merged intermediate representation on the device, the processing logic compiles the merged intermediate representation into native machine code of the device and caches the native machine code corresponding to the merged intermediate representation into the device.

Figure 4:
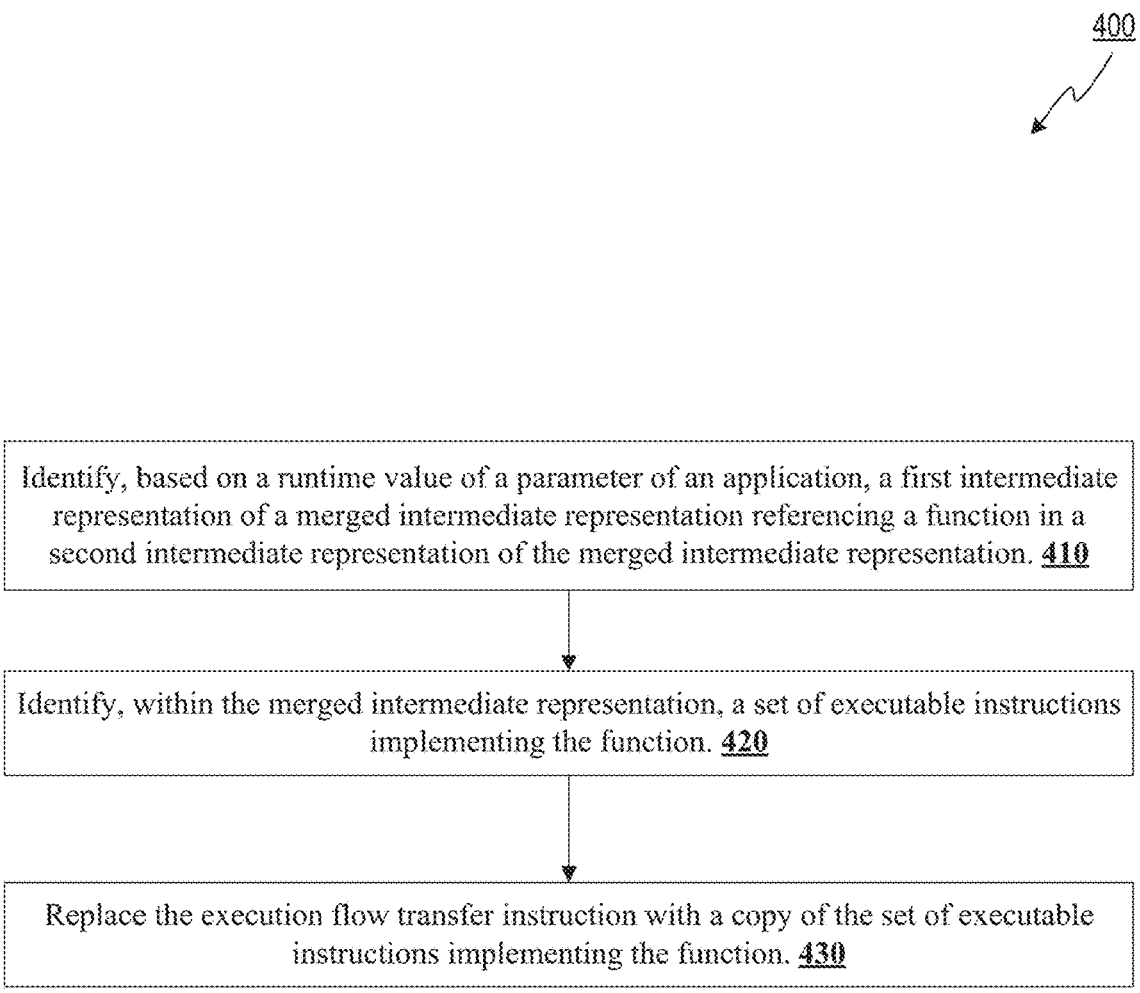
FIG. 4 is a flow diagram of yet another method of performing JIT LTO, in accordance with at least one embodiment.

Referring to FIG. 4, at block 410, the processing logic identifies, based on a run-time value of a parameter of an application, a first intermediate representation of a merged intermediate representation referencing a function in a second intermediate representation of the merged intermediate representation. In some embodiments, the first intermediate representation and/or the second intermediate representation may be generated by a compiler at compile time. In some embodiments, when receiving the first intermediate representation and the second intermediate representation, the processing logic stores the first intermediate representation and the second intermediate representation in the processing device. As previously described, the processing logic may transform the first portion and second portion of the source code by a compiler to the first and second intermediate representation at compile-time. In yet another embodiment the first intermediate representation and/or the second intermediate representation may be generated by a compiler, prior to merging, at run-time. As previously described, the processing logic may transform the first portion and second portion of the source code by a compiler to the first and second intermediate representation at run-time.

Depending on the embodiment, the processing device may include an application programming interface (API). As previously described, the run-time value of the application parameter may be known at run-time via an application programming interface (API) in communication with the device.

At block 420, the processing logic identifies, within the merged intermediate representation, a set of executable instructions implementing the function. As previously described, the set of executable instructions implementing the function associated with the function determined by the run-time value of the application parameter. At block 430, the processing logic replaces the execution flow transfer instruction with a copy of the set of executable instructions implementing the function.

Depending on the embodiment, the processing logic executes the merged intermediate representation on the device. In some embodiments, to execute the merged intermediate representation on the device, the processing logic compiles the merged intermediate representation into native machine code of the device and caches the native machine code corresponding to the merged intermediate representation into the device.

Inference and Training Logic

Figure 5A:
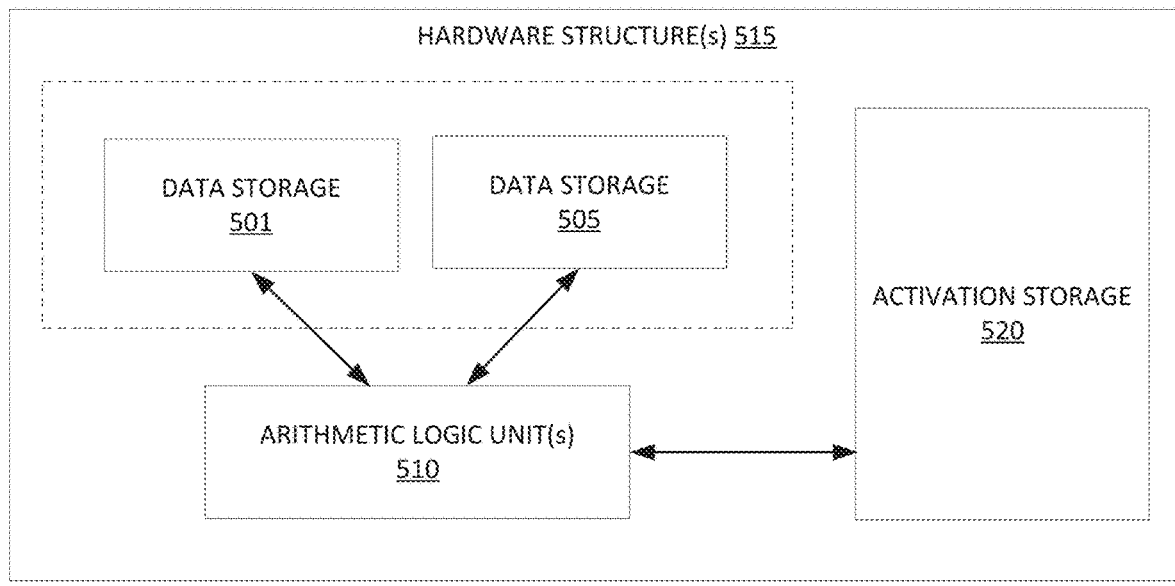
FIG. 5A illustrates inference and/or training logic, according to at least one embodiment.

FIG. 5A illustrates inference and/or training logic 515 used to perform inferencing and/or training operations associated with one or more embodiments. Details regarding inference and/or training logic 515 are provided below in conjunction with FIGS. 5A and/or 5B.

In at least one embodiment, inference and/or training logic 515 may include, without limitation, code and/or data storage 501 to store forward and/or output weight and/or input/output data, and/or other parameters to configure neurons or layers of a neural network trained and/or used for inferencing in aspects of one or more embodiments. In at least one embodiment, training logic 515 may include, or be coupled to code and/or data storage 501 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 501 may be included with other on-chip or off-chip data storage, including a processor's L1, L2, or L3 cache or system memory.

In at least one embodiment, any portion of code and/or data storage 501 may be internal or external to one or more processors or other hardware logic devices or circuits. In at least one embodiment, code and/or code and/or data storage 501 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 515 may include, without limitation, a code and/or data storage 505 to store backward and/or output weight and/or input/output data corresponding to neurons or layers of a neural network trained and/or used for inferencing in aspects of one or more embodiments. In at least one embodiment, code and/or data storage 505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 515 may include, or be coupled to code and/or data storage 505 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 505 may be included with other on-chip or off-chip data storage, including a processor's L1, L2, or L3 cache or system memory. In at least one embodiment, any portion of code and/or data storage 505 may be internal or external to on one or more processors or other hardware logic devices or circuits. In at least one embodiment, code and/or data storage 505 may be cache memory, DRAM, SRAM, non-volatile memory (e.g., Flash memory), or other storage. In at least one embodiment, choice of whether code and/or data storage 505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 501 and code and/or data storage 505 may be separate storage structures. In at least one embodiment, code and/or data storage 501 and code and/or data storage 505 may be same storage structure. In at least one embodiment, code and/or data storage 501 and code and/or data storage 505 may be partially same storage structure and partially separate storage structures. In at least one embodiment, any portion of code and/or data storage 501 and code and/or data storage 505 may be included with other on-chip or off-chip data storage, including a processor's L1, L2, or L3 cache or system memory.

In at least one embodiment, inference and/or training logic 515 may include, without limitation, one or more arithmetic logic unit(s) ("ALU(s)") 510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 520 that are functions of input/output and/or weight parameter data stored in code and/or data storage 501 and/or code and/or data storage 505. In at least one embodiment, activations stored in activation storage 520 are generated according to linear algebraic and or matrix-based mathematics performed by ALU(s) 510 in response to performing instructions or other code, wherein weight values stored in code and/or data storage 505 and/or code and/or data storage 501 are used as operands along with other values, such as bias values, gradient information, momentum values, or other parameters or hyperparameters, any or all of which may be stored in code and/or data storage 505 or code and/or data storage 501 or another storage on or off-chip.

In at least one embodiment, ALU(s) 510 are included within one or more processors or other hardware logic devices or circuits, whereas in another embodiment, ALU(s) 510 may be external to a processor or other hardware logic device or circuit that uses them (e.g., a co-processor). In at least one embodiment, ALUs 510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 501, code and/or data storage 505, and activation storage 520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 520 may be cache memory, DRAM, SRAM, non-volatile memory (e.g., Flash memory), or other storage. In at least one embodiment, activation storage 520 may be completely or partially within or external to one or more processors or other logical circuits. In at least one embodiment, choice of whether activation storage 520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 515 illustrated in FIG. 5A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5A may be used in conjunction with central processing unit ("CPU") hardware, graphics processing unit ("GPU") hardware or other hardware, such as data processing unit ("DPU") hardware, or field programmable gate arrays ("FPGAs").

Figure 5B:
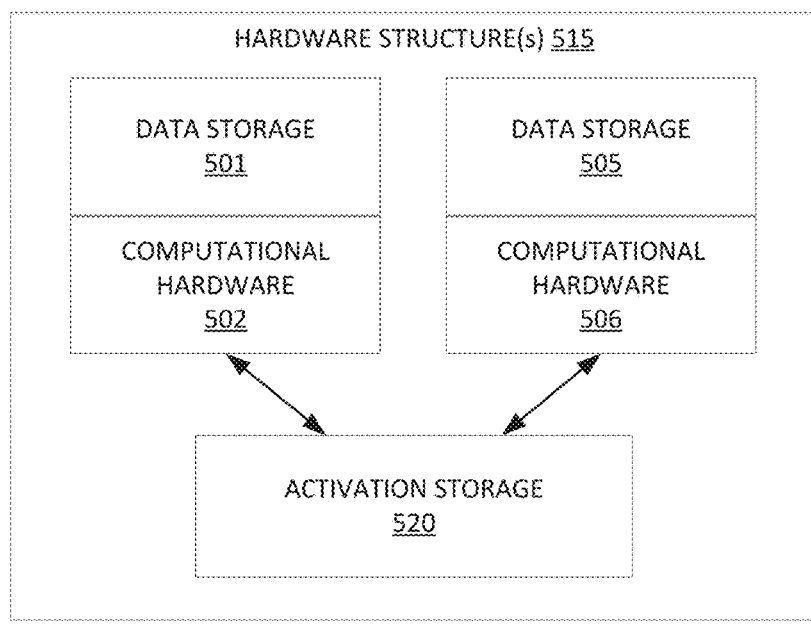
FIG. 5B illustrates inference and/or training logic, according to at least one embodiment.

FIG. 5B illustrates inference and/or training logic 515, according to at least one or more embodiments. In at least one embodiment, inference and/or training logic 515 may include, without limitation, hardware logic in which computational resources are dedicated or otherwise exclusively used in conjunction with weight values or other information corresponding to one or more layers of neurons within a neural network. In at least one embodiment, inference and/or training logic 515 illustrated in FIG. 5B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 515 includes, without limitation, code and/or data storage 501 and code and/or data storage 505, which may be used to store code (e.g., graph code), weight values and/or other information, including bias values, gradient information, momentum values, and/or other parameter or hyperparameter information. In at least one embodiment illustrated in FIG. 5B, each of code and/or data storage 501 and code and/or data storage 505 is associated with a dedicated computational resource, such as computational hardware 502 and computational hardware 506, respectively. In at least one embodiment, each of computational hardware 502 and computational hardware 506 comprises one or more ALUs that perform mathematical functions, such as linear algebraic functions, only on information stored in code and/or data storage 501 and code and/or data storage 505, respectively, result of which is stored in activation storage 520.

In at least one embodiment, each of code and/or data storage 501 and 505 and corresponding computational hardware 502 and 506, respectively, correspond to different layers of a neural network, such that resulting activation from one "storage/computational pair 501/902" of code and/or data storage 501 and computational hardware 502 is provided as an input to "storage/computational pair 505/906" of code and/or data storage 505 and computational hardware 506, in order to mirror conceptual organization of a neural network. In at least one embodiment, each of storage/computational pairs 501/902 and 505/906 may correspond to more than one neural network layer. In at least one embodiment, additional storage/computation pairs (not shown) subsequent to or in parallel with storage computation pairs 501/902 and 505/906 may be included in inference and/or training logic 515.

Data Center

Figure 6:
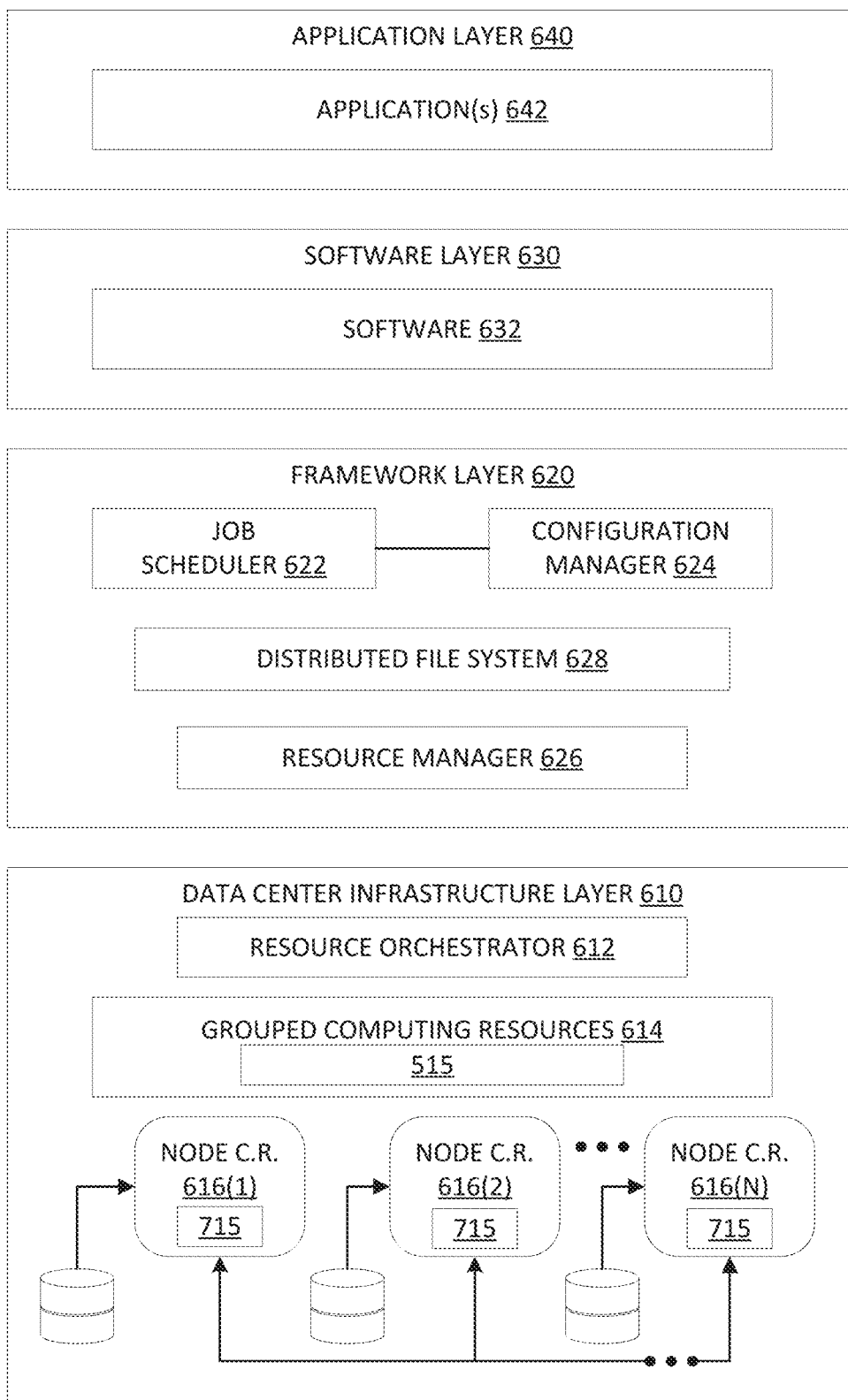
FIG. 6 illustrates an example data center system, according to at least one embodiment.

FIG. 6 illustrates an example data center 600, in which at least one embodiment may be used. In at least one embodiment, data center 600 includes a data center infrastructure layer 610, a framework layer 620, a software layer 630, and an application layer 640.

In at least one embodiment, as shown in FIG. 6, data center infrastructure layer 610 may include a resource orchestrator 612, grouped computing resources 614, and node computing resources ("node C.R.s") 616(1)-1016(N), where "N" represents any whole, positive integer. In at least one embodiment, node C.R.s 616(1)-1016(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-1016(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-1016(N) and/or grouped computing resources 614. In at least one embodiment, resource orchestrator 612 may include a software design infrastructure ("SDI") management entity for data center 600. In at least one embodiment, resource orchestrator may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resource 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-1016(N), grouped computing resources 614, and/or distributed file system 628 of framework layer 620. The one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-1016(N), grouped computing resources 614, and/or distributed file system 628 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center 600 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 600. In at least one embodiment, trained machine learning models corresponding to one or more neural networks may be used to infer or predict information using resources described above with respect to data center 600 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 6 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 7:
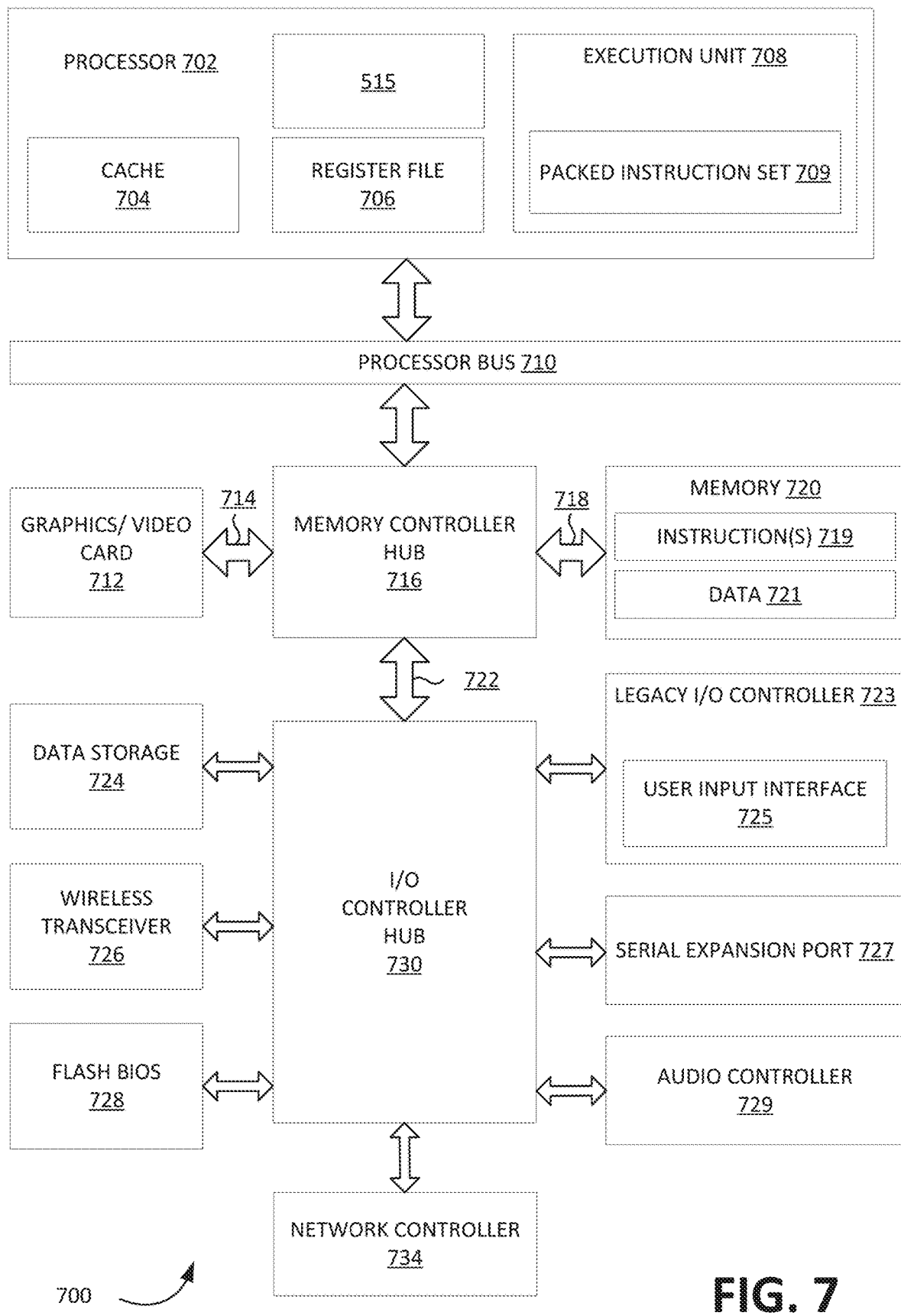
FIG. 7 illustrates a computer system, according to at least one embodiment.

FIG. 7 is a block diagram illustrating an exemplary computer system, which may be a system with interconnected devices and components, a system-on-a-chip (SOC) or some combination thereof 700 formed with a processor that may include execution units to execute an instruction, according to at least one embodiment. In at least one embodiment, computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 700 may include, without limitation, processor 702 that may include, without limitation, one or more execution units 708 to perform machine learning model training and/or inferencing according to techniques described herein. In at least one embodiment, computer system 700 is a single processor desktop or server system, but in another embodiment computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, register file 706 may store different types of data in various registers including, without limitation, integer registers, floating point registers, status registers, and instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be implemented as a Dynamic Random Access Memory ("DRAM") device, a Static Random Access Memory ("SRAM") device, flash memory device, or other memory device. In at least one embodiment, memory 720 may store instruction(s) 719 and/or data 721 represented by data signals that may be executed by processor 702.

In at least one embodiment, system logic chip may be coupled to processor bus 710 and memory 720. In at least one embodiment, system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through a high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as Universal Serial Bus ("USB"), and a network controller 734, which may include in some embodiments, a data processing unit. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips", whereas in other embodiments, FIG. 7 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 700 are interconnected using compute express link (CXL) interconnects.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
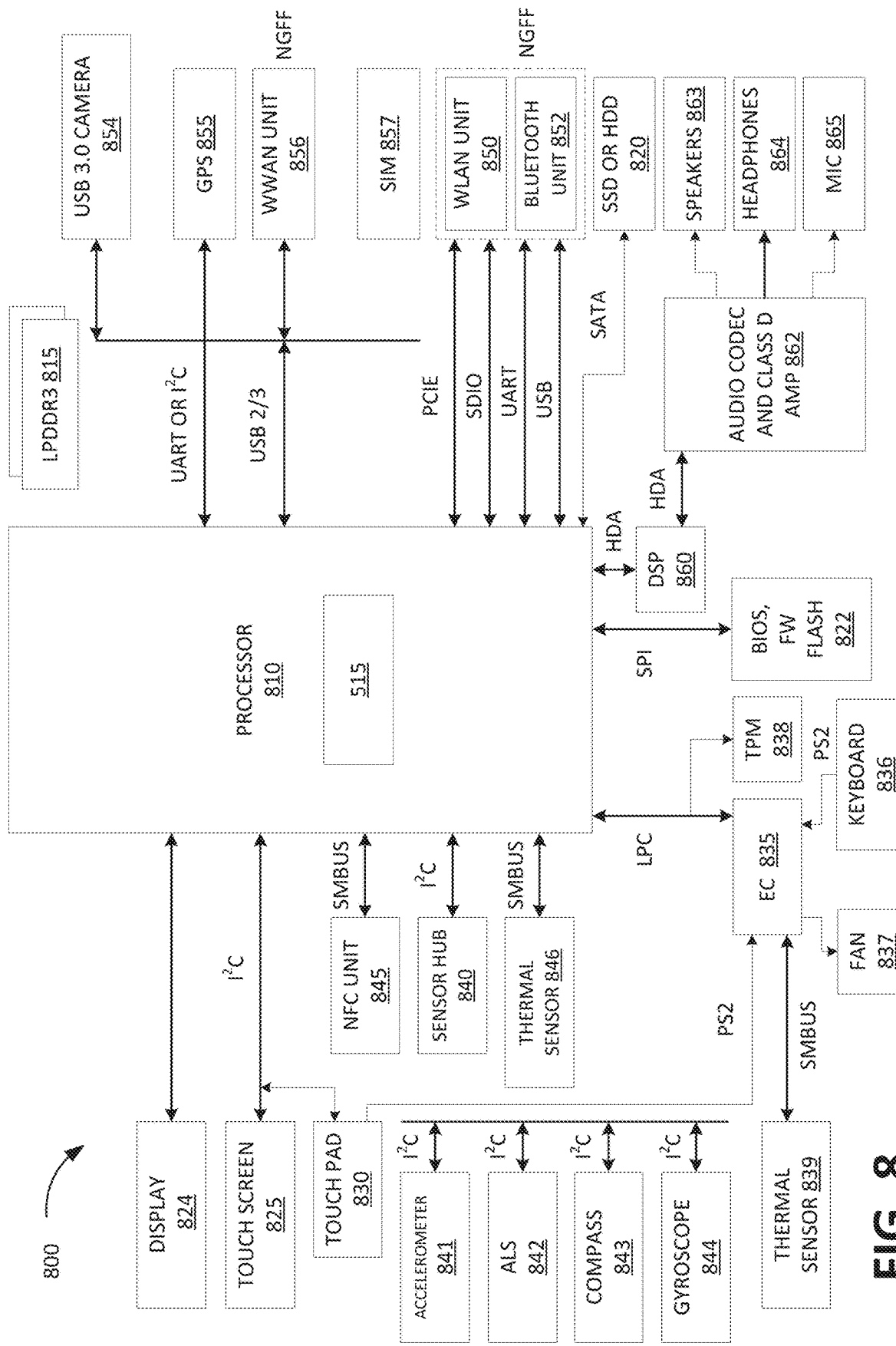
FIG. 8 illustrates a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 800 may include, without limitation, processor 810 communicatively coupled to any suitable number or kind of components, peripherals, modules, or devices. In at least one embodiment, processor 810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using compute express link (CXL) interconnects.

In at least one embodiment, FIG. 8 may include a display 824, a touch screen 825, a touch pad 830, a Near Field Communications unit ("NEC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) 855, a camera ("USB 3.0 camera") 854 such as a USB 3.0 camera, and/or a Low Power Double Data Rate ("LPDDR") memory unit ("LPDDR3") 815 implemented in, for example, LPDDR3 standard. These components may each be implemented in any suitable manner.

In at least one embodiment, other components may be communicatively coupled to processor 810 through components discussed above. In at least one embodiment, an accelerometer 841, Ambient Light Sensor ("ALS") 842, compass 843, and a gyroscope 844 may be communicatively coupled to sensor hub 840. In at least one embodiment, thermal sensor 839, a fan 837, a keyboard 836, and a touch pad 830 may be communicatively coupled to EC 835. In at least one embodiment, speaker 863, headphones 864, and microphone ("mic") 865 may be communicatively coupled to an audio unit ("audio codec and class d amp") 862, which may in turn be communicatively coupled to DSP 860. In at least one embodiment, audio unit 864 may include, for example and without limitation, an audio coder/decoder ("codec") and a class D amplifier. In at least one embodiment, SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
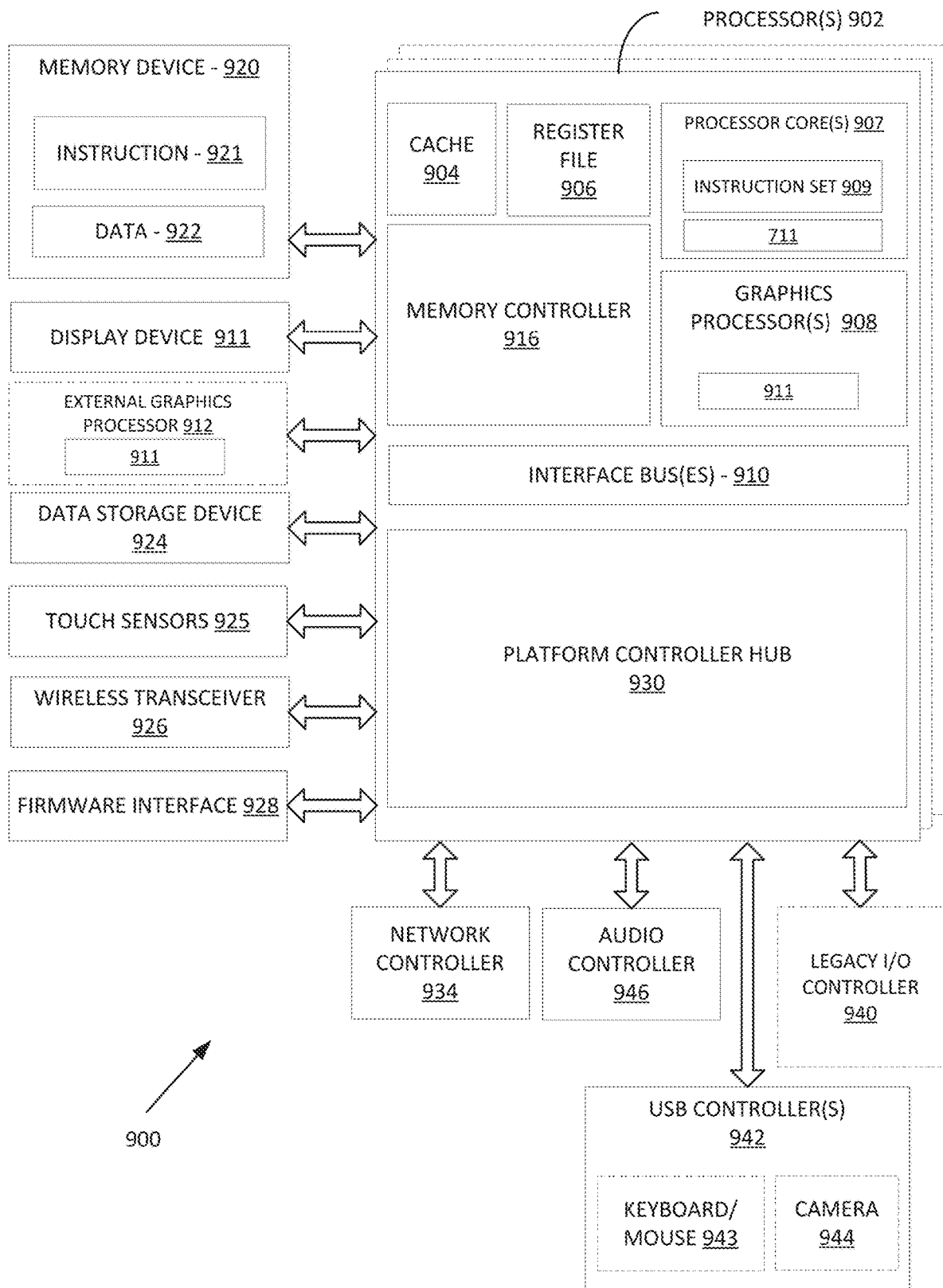
FIG. 9 illustrates at least portions of a graphics processor, according to one or more embodiments.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, edge, or embedded devices.

In at least one embodiment, system 900 may include, or be incorporated within a server-based gaming platform, a game console, including a game and media console, a mobile gaming console, a handheld game console, or an online game console. In at least one embodiment, system 900 is a mobile phone, smart phone, tablet computing device or mobile Internet device. In at least one embodiment, processing system 900 may also include, couple with, or be integrated within a wearable device, such as a smart watch wearable device, smart eyewear device, augmented reality device, or virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction set 909. In at least one embodiment, instruction set 909 may facilitate Complex Instruction Set Computing (CISC), Reduced Instruction Set Computing (RISC), or computing via a Very Long Instruction Word (VLIW). In at least one embodiment, processor cores 907 may each process a different instruction set 909, which may include instructions to facilitate emulation of other instruction sets. In at least one embodiment, processor core 907 may also include other processing devices, such a Digital Signal Processor (DSP).

In at least one embodiment, processor 902 includes cache memory 904. In at least one embodiment, processor 902 may have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, register file 906 is additionally included in processor 902 which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910, in one embodiment, may be a processor bus, such as a version of a Direct Media Interface (DMI) bus. In at least one embodiment, interface 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, memory device 920 may be a dynamic random access memory (DRAM) device, a static random access memory (SRAM) device, flash memory device, phase-change memory device, or some other memory device having suitable performance to serve as process memory. In at least one embodiment memory device 920 may operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 may connect to processor(s) 902. In at least one embodiment display device 911 may include one or more of an internal display device, as in a mobile electronic device or a laptop device or an external display device attached via a display interface (e.g., DisplayPort, etc.). In at least one embodiment, display device 911 may include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 may connect via a storage interface (e.g., SATA) or via a peripheral bus, such as a Peripheral Component Interconnect bus (e.g., PCI, PCI Express). In at least one embodiment, touch sensors 925 may include touch screen sensors, pressure sensors, or fingerprint sensors. In at least one embodiment, wireless transceiver 926 may be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and may be, for example, a unified extensible firmware interface (UEFI). In at least one embodiment, network controller 934 may enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system. In at least one embodiment, platform controller hub 930 may also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 may include an external memory controller 916 and platform controller hub 930, which may be configured as a memory controller hub and peripheral controller hub within a system chipset that is in communication with processor(s) 902.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into graphics processor 1000. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 10:
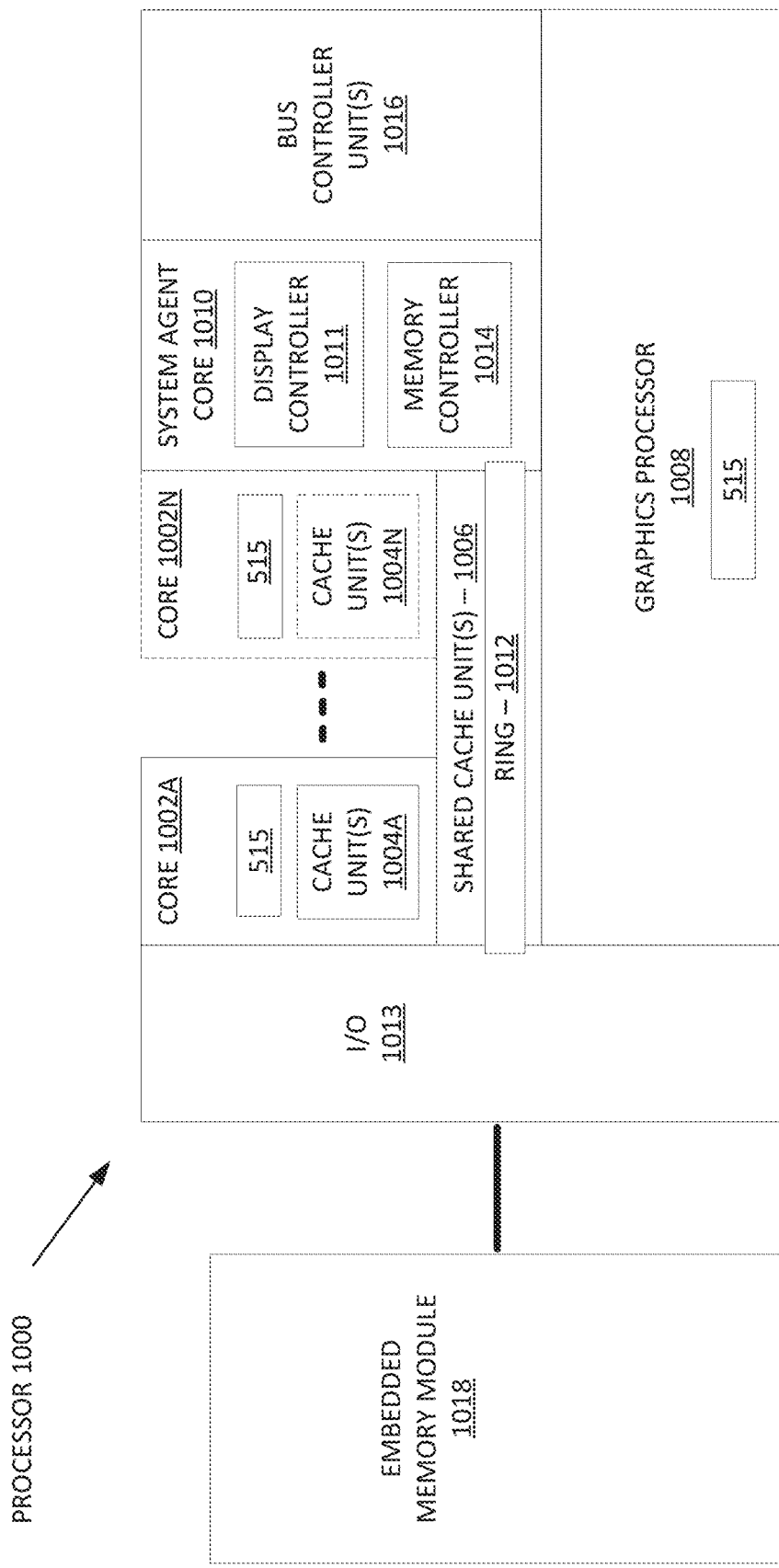
FIG. 10 illustrates at least portions of a graphics processor, according to one or more embodiments.

FIG. 10 is a block diagram of a processor 1000 having one or more processor cores 1002A-1402N, an integrated memory controller 1014, and an integrated graphics processor 1008, according to at least one embodiment. In at least one embodiment, processor 1000 may include additional cores up to and including additional core 1002N represented by dashed lined boxes. In at least one embodiment, each of processor cores 1002A-1402N includes one or more internal cache units 1004A-1404N. In at least one embodiment, each processor core also has access to one or more shared cached units 1006.

In at least one embodiment, internal cache units 1004A-1404N and shared cache units 1006 represent a cache memory hierarchy within processor 1000. In at least one embodiment, cache memory units 1004A-1404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1006 and 1004A-1404N.

In at least one embodiment, processor 1000 may also include a set of one or more bus controller units 1016 and a system agent core 1010. In at least one embodiment, one or more bus controller units 1016 manage a set of peripheral buses, such as one or more PCI or PCI express busses. In at least one embodiment, system agent core 1010 provides management functionality for various processor components. In at least one embodiment, system agent core 1010 includes one or more integrated memory controllers 1014 to manage access to various external memory devices (not shown).

In at least one embodiment, one or more of processor cores 1002A-1402N include support for simultaneous multi-threading. In at least one embodiment, system agent core 1010 includes components for coordinating and operating cores 1002A-1402N during multi-threaded processing. In at least one embodiment, system agent core 1010 may additionally include a power control unit (PCU), which includes logic and components to regulate one or more power states of processor cores 1002A-1402N and graphics processor 1008.

In at least one embodiment, processor 1000 additionally includes graphics processor 1008 to execute graphics processing operations. In at least one embodiment, graphics processor 1008 couples with shared cache units 1006, and system agent core 1010, including one or more integrated memory controllers 1014. In at least one embodiment, system agent core 1010 also includes a display controller 1011 to drive graphics processor output to one or more coupled displays. In at least one embodiment, display controller 1011 may also be a separate module coupled with graphics processor 1008 via at least one interconnect, or may be integrated within graphics processor 1008.

In at least one embodiment, a ring based interconnect unit 1012 is used to couple internal components of processor 1000. In at least one embodiment, an alternative interconnect unit may be used, such as a point-to-point interconnect, a switched interconnect, or other techniques. In at least one embodiment, graphics processor 1008 couples with ring interconnect 1012 via an I/O link 1013.

In at least one embodiment, I/O link 1013 represents at least one of multiple varieties of I/O interconnects, including an on package I/O interconnect which facilitates communication between various processor components and a high-performance embedded memory module 1018, such as an eDRAM module. In at least one embodiment, each of processor cores 1002A-1402N and graphics processor 1008 use embedded memory modules 1018 as a shared Last Level Cache.

In at least one embodiment, processor cores 1002A-1402N are homogenous cores executing a common instruction set architecture. In at least one embodiment, processor cores 1002A-1402N are heterogeneous in terms of instruction set architecture (ISA), where one or more of processor cores 1002A-1402N execute a common instruction set, while one or more other cores of processor cores 1002A-1402N executes a subset of a common instruction set or a different instruction set. In at least one embodiment, processor cores 1002A-1402N are heterogeneous in terms of microarchitecture, where one or more cores having a relatively higher power consumption couple with one or more power cores having a lower power consumption. In at least one embodiment, processor 1000 may be implemented on one or more chips or as an SoC integrated circuit.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into processor 1000. For example, in at least one embodiment, training and/or inferencing techniques described herein may use one or more of ALUs embodied in graphics processor 1008, graphics core(s) 1002A-1402N, or other components in FIG. 10. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of graphics processor 1000 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 11:
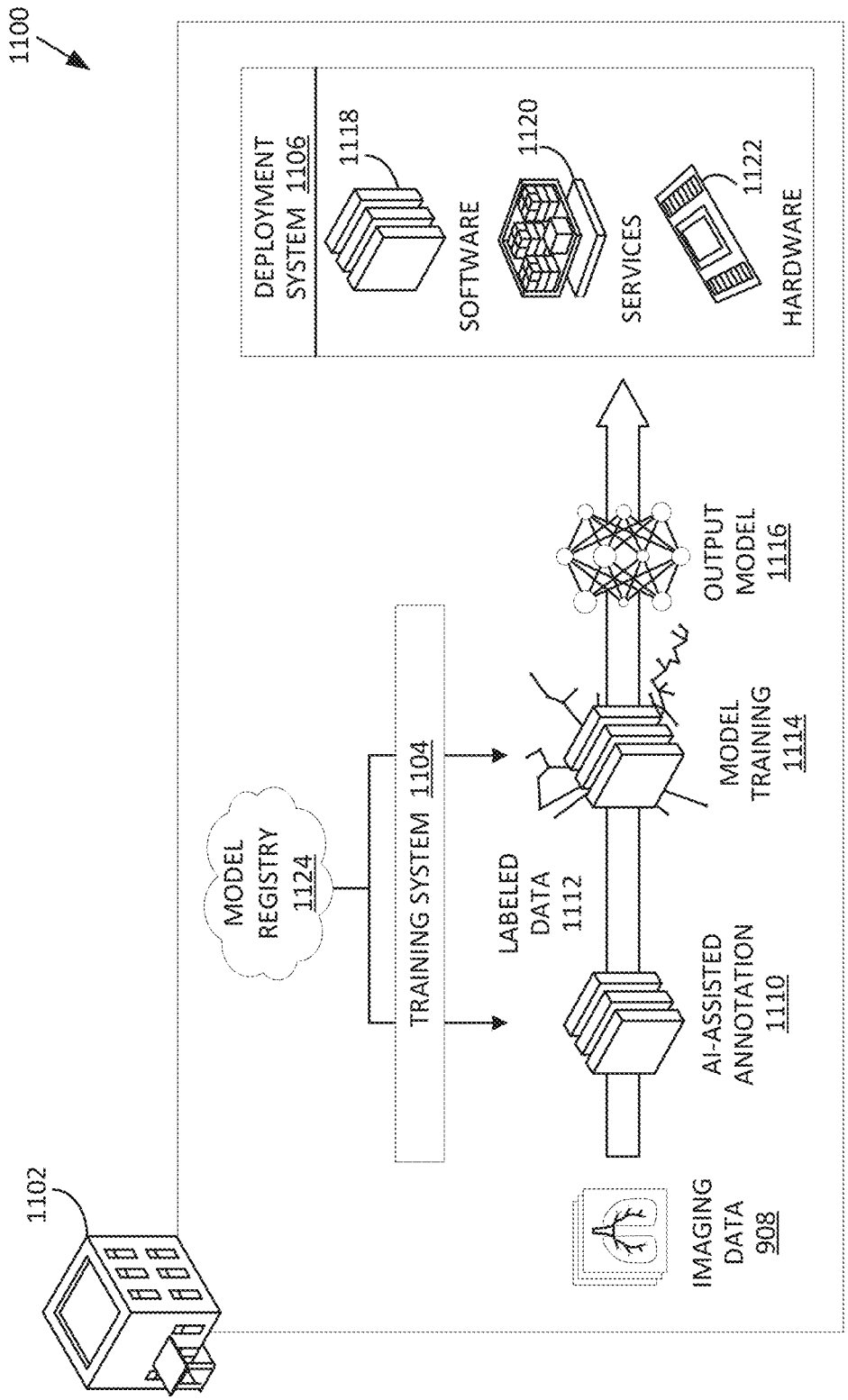
FIG. 11 is an example data flow diagram for an advanced computing pipeline, in accordance with at least one embodiment.

FIG. 11 is an example data flow diagram for a process 1100 of generating and deploying an image processing and inferencing pipeline, in accordance with at least one embodiment. In at least one embodiment, process 1100 may be deployed for use with imaging devices, processing devices, and/or other device types at one or more facilities 1102. Process 1100 may be executed within a training system 1104 and/or a deployment system 1106. In at least one embodiment, training system 1104 may be used to perform training, deployment, and implementation of machine learning models (e.g., neural networks, object detection algorithms, computer vision algorithms, etc.) for use in deployment system 1106. In at least one embodiment, deployment system 1106 may be configured to offload processing and compute resources among a distributed computing environment to reduce infrastructure requirements at facility 1102. In at least one embodiment, one or more applications in a pipeline may use or call upon services (e.g., inference, visualization, compute, AI, etc.) of deployment system 1106 during execution of applications.

In at least one embodiment, some of applications used in advanced processing and inferencing pipelines may use machine learning models or other AI to perform one or more processing steps. In at least one embodiment, machine learning models may be trained at facility 1102 using data 1108 (such as imaging data) generated at facility 1102 (and stored on one or more picture archiving and communication system (PACS) servers at facility 1102), may be trained using imaging or sequencing data 1108 from another facility(ies), or a combination thereof. In at least one embodiment, training system 1104 may be used to provide applications, services, and/or other resources for generating working, deployable machine learning models for deployment system 1106.

In at least one embodiment, model registry 1124 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1124 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1102 is training their own machine learning model, or has an existing machine learning model that needs to be optimized or updated. In at least one embodiment, imaging data 1108 generated by imaging device(s), sequencing devices, and/or other device types may be received. In at least one embodiment, once imaging data 1108 is received, AI-assisted annotation 1110 may be used to aid in generating annotations corresponding to imaging data 1108 to be used as ground truth data for a machine learning model. In at least one embodiment, AI-assisted annotation 1110 may include one or more machine learning models (e.g., convolutional neural networks (CNNs)) that may be trained to generate annotations corresponding to certain types of imaging data 1108 (e.g., from certain devices). In at least one embodiment, AI-assisted annotations 1110 may then be used directly, or may be adjusted or fine-tuned using an annotation tool to generate ground truth data. In at least one embodiment, AI-assisted annotations 1110, labeled clinic data 1112, or a combination thereof may be used as ground truth data for training a machine learning model. In at least one embodiment, a trained machine learning model may be referred to as output model 1116, and may be used by deployment system 1106, as described herein.

In at least one embodiment, training pipeline 1204 (FIG. 12) may include a scenario where facility 1102 needs a machine learning model for use in performing one or more processing tasks for one or more applications in deployment system 1106, but facility 1102 may not currently have such a machine learning model (or may not have a model that is optimized, efficient, or effective for such purposes). In at least one embodiment, an existing machine learning model may be selected from a model registry 1124. In at least one embodiment, model registry 1124 may include machine learning models trained to perform a variety of different inference tasks on imaging data. In at least one embodiment, machine learning models in model registry 1124 may have been trained on imaging data from different facilities than facility 1102 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1124. In at least one embodiment, a machine learning model may then be retrained, or updated, at any number of other facilities, and a retrained or updated model may be made available in model registry 1124. In at least one embodiment, a machine learning model may then be selected from model registry 1124—and referred to as output model 1116—and may be used in deployment system 1106 to perform one or more processing tasks for one or more applications of a deployment system.

In at least one embodiment, training pipeline 1204 (FIG. 12), a scenario may include facility 1102 requiring a machine learning model for use in performing one or more processing tasks for one or more applications in deployment system 1106, but facility 1102 may not currently have such a machine learning model (or may not have a model that is optimized, efficient, or effective for such purposes). In at least one embodiment, a machine learning model selected from model registry 1124 may not be fine-tuned or optimized for imaging data 1108 generated at facility 1102 because of differences in populations, robustness of training data used to train a machine learning model, diversity in anomalies of training data, and/or other issues with training data. In at least one embodiment, AI-assisted annotation 1110 may be used to aid in generating annotations corresponding to imaging data 1108 to be used as ground truth data for retraining or updating a machine learning model. In at least one embodiment, labeled data 1112 may be used as ground truth data for training a machine learning model. In at least one embodiment, retraining or updating a machine learning model may be referred to as model training 1114. In at least one embodiment, model training 1114—e.g., AI-assisted annotations 1110, labeled clinic data 1112, or a combination thereof—may be used as ground truth data for retraining or updating a machine learning model. In at least one embodiment, a trained machine learning model may be referred to as output model 1116, and may be used by deployment system 1106, as described herein.

In at least one embodiment, deployment system 1106 may include software 1118, services 1120, hardware 1122, and/or other components, features, and functionality. In at least one embodiment, deployment system 1106 may include a software "stack," such that software 1118 may be built on top of services 1120 and may use services 1120 to perform some or all of processing tasks, and services 1120 and software 1118 may be built on top of hardware 1122 and use hardware 1122 to execute processing, storage, and/or other compute tasks of deployment system 1106. In at least one embodiment, software 1118 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1108, in addition to containers that receive and configure imaging data for use by each container and/or for use by facility 1102 after processing through a pipeline (e.g., to convert outputs back to a usable data type). In at least one embodiment, a combination of containers within software 1118 (e.g., that make up a pipeline) may be referred to as a virtual instrument (as described in more detail herein), and a virtual instrument may leverage services 1120 and hardware 1122 to execute some or all processing tasks of applications instantiated in containers.

In at least one embodiment, a data processing pipeline may receive input data (e.g., imaging data 1108) in a specific format in response to an inference request (e.g., a request from a user of deployment system 1106). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1116 of training system 1104.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1124 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1120 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

Figure 12:
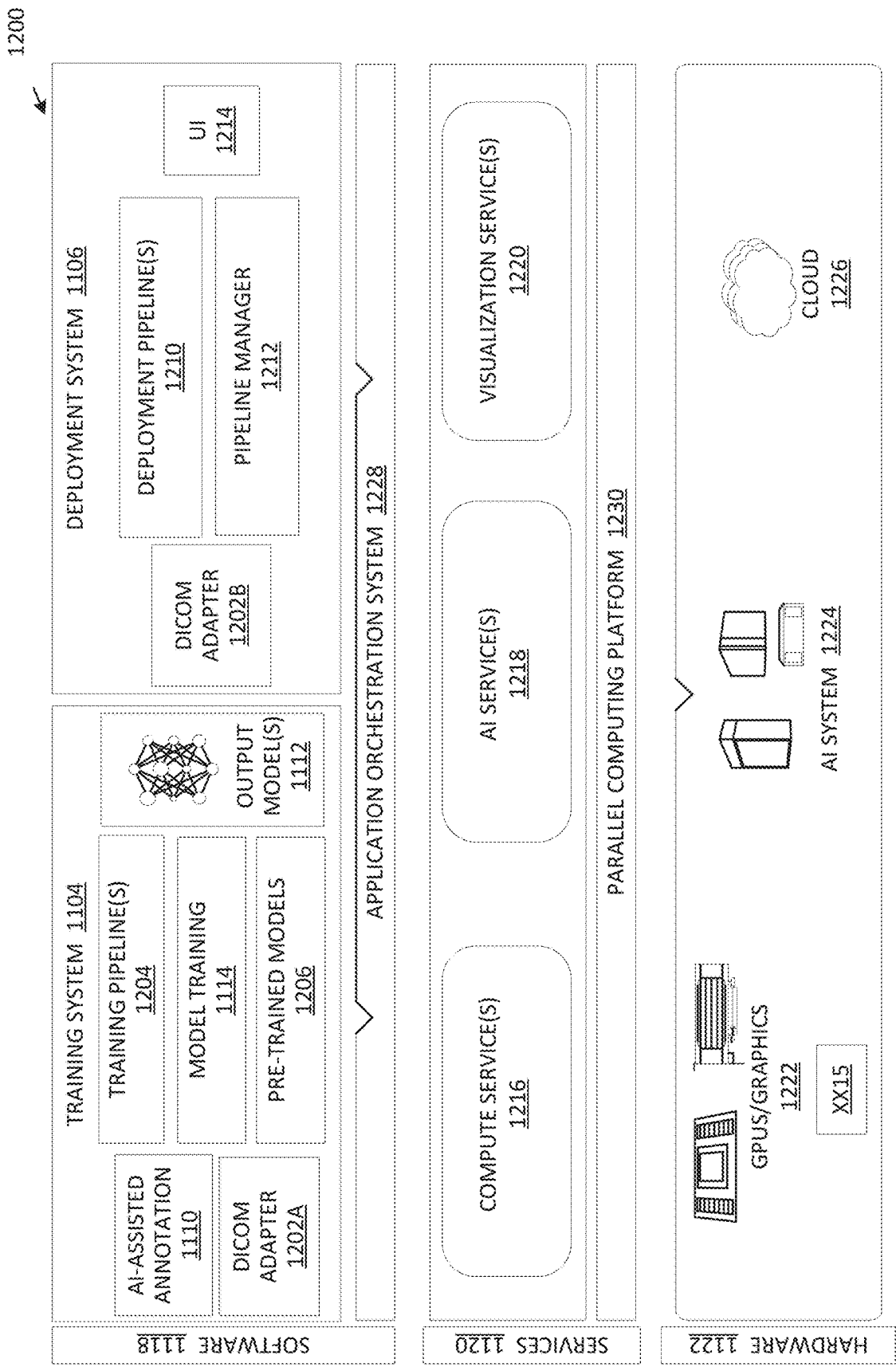
FIG. 12 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1124. In at least one embodiment, a requesting entity—who provides an inference or image processing request—may browse a container registry and/or model registry 1124 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1106 (e.g., a cloud) to perform processing of data processing pipeline. In at least one embodiment, processing by deployment system 1106 may include referencing selected elements (e.g., applications, containers, models, etc.) from a container registry and/or model registry 1124. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1120 may be leveraged. In at least one embodiment, services 1120 may include compute services, artificial intelligence (AI) services, visualization services, and/or other service types. In at least one embodiment, services 1120 may provide functionality that is common to one or more applications in software 1118, so functionality may be abstracted to a service that may be called upon or leveraged by applications. In at least one embodiment, functionality provided by services 1120 may run dynamically and more efficiently, while also scaling well by allowing applications to process data in parallel (e.g., using a parallel computing platform 1230 (FIG. 12)). In at least one embodiment, rather than each application that shares a same functionality offered by a service 1120 being required to have a respective instance of service 1120, service 1120 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1120 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1118 implementing advanced processing and inferencing pipeline that includes segmentation application and anomaly detection application may be streamlined because each application may call upon a same inference service to perform one or more inferencing tasks.

In at least one embodiment, hardware 1122 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1122 may be used to provide efficient, purpose-built support for software 1118 and services 1120 in deployment system 1106. In at least one embodiment, use of GPU processing may be implemented for processing locally (e.g., at facility 1102), within an AI/deep learning system, in a cloud system, and/or in other processing components of deployment system 1106 to improve efficiency, accuracy, and efficacy of image processing and generation. In at least one embodiment, software 1118 and/or services 1120 may be optimized for GPU processing with respect to deep learning, machine learning, and/or high-performance computing, as non-limiting examples. In at least one embodiment, at least some of computing environment of deployment system 1106 and/or training system 1104 may be executed in a datacenter one or more supercomputers or high performance computing systems, with GPU optimized software (e.g., hardware and software combination of NVIDIA's DGX System). In at least one embodiment, hardware 1122 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 12 is a system diagram for an example system 1200 for generating and deploying an imaging deployment pipeline, in accordance with at least one embodiment. In at least one embodiment, system 1200 may be used to implement process 1100 of FIG. 11 and/or other processes including advanced processing and inferencing pipelines. In at least one embodiment, system 1200 may include training system 1104 and deployment system 1106. In at least one embodiment, training system 1104 and deployment system 1106 may be implemented using software 1118, services 1120, and/or hardware 1122, as described herein.

In at least one embodiment, system 1200 (e.g., training system 1104 and/or deployment system 1106) may implemented in a cloud computing environment (e.g., using cloud 1226). In at least one embodiment, system 1200 may be implemented locally with respect to a healthcare services facility, or as a combination of both cloud and local computing resources. In at least one embodiment, access to APIs in cloud 1226 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1200, may be restricted to a set of public IPs that have been vetted or authorized for interaction.

In at least one embodiment, various components of system 1200 may communicate between and among one another using any of a variety of different network types, including but not limited to local area networks (LANs) and/or wide area networks (WANs) via wired and/or wireless communication protocols. In at least one embodiment, communication between facilities and components of system 1200 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1104 may execute training pipelines 1204, similar to those described herein with respect to FIG. 11. In at least one embodiment, where one or more machine learning models are to be used in deployment pipelines 1210 by deployment system 1106, training pipelines 1204 may be used to train or retrain one or more (e.g. pre-trained) models, and/or implement one or more of pre-trained models 1206 (e.g., without a need for retraining or updating). In at least one embodiment, as a result of training pipelines 1204, output model(s) 1116 may be generated. In at least one embodiment, training pipelines 1204 may include any number of processing steps, such as but not limited to imaging data (or other input data) conversion or adaption In at least one embodiment, for different machine learning models used by deployment system 1106, different training pipelines 1204 may be used. In at least one embodiment, training pipeline 1204 similar to a first example described with respect to FIG. 11 may be used for a first machine learning model, training pipeline 1204 similar to a second example described with respect to FIG. 11 may be used for a second machine learning model, and training pipeline 1204 similar to a third example described with respect to FIG. 11 may be used for a third machine learning model. In at least one embodiment, any combination of tasks within training system 1104 may be used depending on what is required for each respective machine learning model. In at least one embodiment, one or more of machine learning models may already be trained and ready for deployment so machine learning models may not undergo any processing by training system 1104, and may be implemented by deployment system 1106.

In at least one embodiment, output model(s) 1116 and/or pre-trained model(s) 1206 may include any types of machine learning models depending on implementation or embodiment. In at least one embodiment, and without limitation, machine learning models used by system 1200 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 13A:
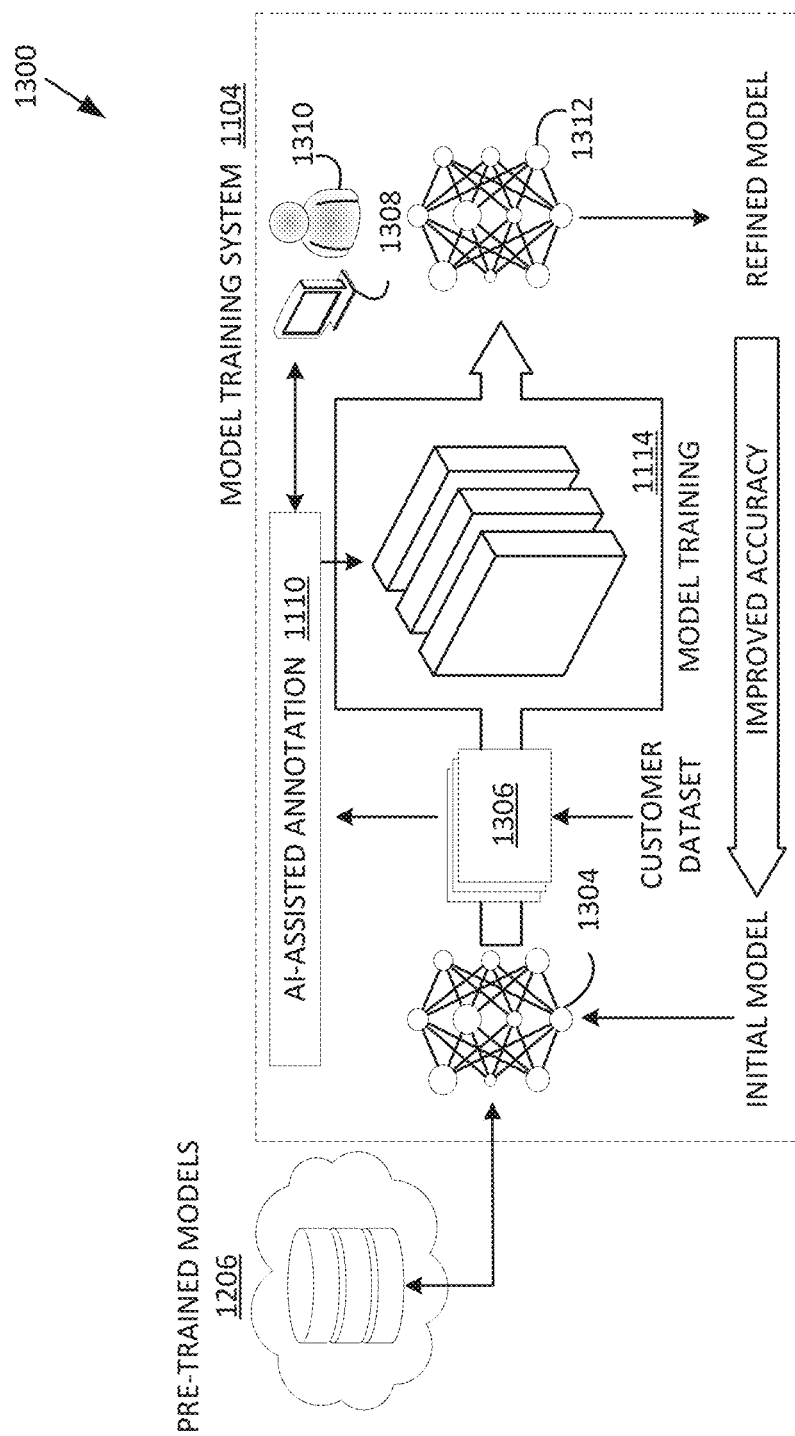
FIGS. 13A and 13B illustrate a data flow diagram for a process to train a machine learning model, as well as client-server architecture to enhance annotation tools with pre-trained annotation models, in accordance with at least one embodiment.
Figure 13B:
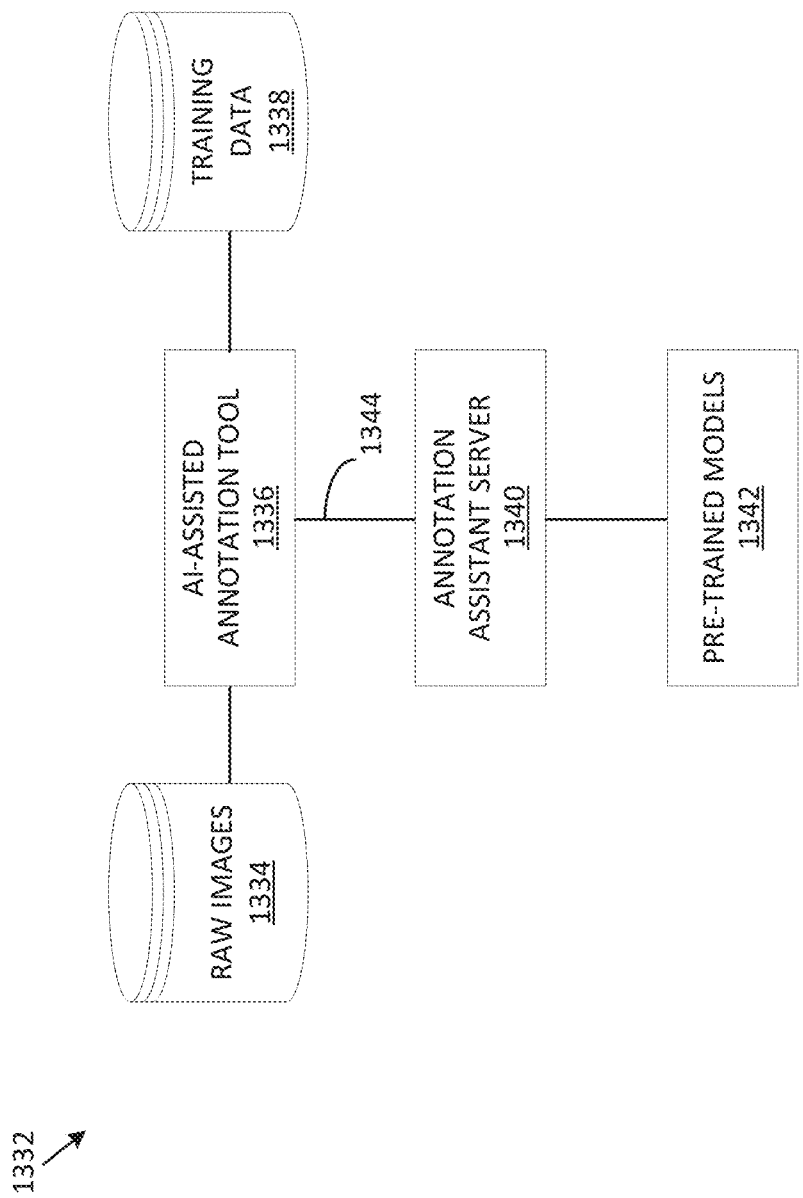

In at least one embodiment, training pipelines 1204 may include AI-assisted annotation, as described in more detail herein with respect to at least FIG. 13B. In at least one embodiment, labeled data 1112 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1108 (or other data type used by machine learning models), there may be corresponding ground truth data generated by training system 1104. In at least one embodiment, AI-assisted annotation may be performed as part of deployment pipelines 1210; either in addition to, or in lieu of AI-assisted annotation included in training pipelines 1204. In at least one embodiment, system 1200 may include a multi-layer platform that may include a software layer (e.g., software 1118) of diagnostic applications (or other application types) that may perform one or more medical imaging and diagnostic functions. In at least one embodiment, system 1200 may be communicatively coupled to (e.g., via encrypted links) PACS server networks of one or more facilities. In at least one embodiment, system 1200 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1102). In at least one embodiment, applications may then call or execute one or more services 1120 for performing compute, AI, or visualization tasks associated with respective applications, and software 1118 and/or services 1120 may leverage hardware 1122 to perform processing tasks in an effective and efficient manner.

In at least one embodiment, deployment system 1106 may execute deployment pipelines 1210. In at least one embodiment, deployment pipelines 1210 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1210 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1210 depending on information desired from data generated by a device. In at least one embodiment, where detections of anomalies are desired from an Mill machine, there may be a first deployment pipeline 1210, and where image enhancement is desired from output of an MRI machine, there may be a second deployment pipeline 1210.

In at least one embodiment, an image generation application may include a processing task that includes use of a machine learning model. In at least one embodiment, a user may desire to use their own machine learning model, or to select a machine learning model from model registry 1124. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1200—such as services 1120 and hardware 1122—deployment pipelines 1210 may be even more user friendly, provide for easier integration, and produce more accurate, efficient, and timely results.

In at least one embodiment, deployment system 1106 may include a user interface 1214 (e.g., a graphical user interface, a web interface, etc.) that may be used to select applications for inclusion in deployment pipeline(s) 1210, arrange applications, modify, or change applications or parameters or constructs thereof, use and interact with deployment pipeline(s) 1210 during set-up and/or deployment, and/or to otherwise interact with deployment system 1106. In at least one embodiment, although not illustrated with respect to training system 1104, user interface 1214 (or a different user interface) may be used for selecting models for use in deployment system 1106, for selecting models for training, or retraining, in training system 1104, and/or for otherwise interacting with training system 1104.

In at least one embodiment, pipeline manager 1212 may be used, in addition to an application orchestration system 1228, to manage interaction between applications or containers of deployment pipeline(s) 1210 and services 1120 and/or hardware 1122. In at least one embodiment, pipeline manager 1212 may be configured to facilitate interactions from application to application, from application to service 1120, and/or from application or service to hardware 1122. In at least one embodiment, although illustrated as included in software 1118, this is not intended to be limiting, and in some examples (e.g., as illustrated in FIG. 10) pipeline manager 1212 may be included in services 1120. In at least one embodiment, application orchestration system 1228 (e.g., Kubernetes, DOCKER, etc.) may include a container orchestration system that may group applications into containers as logical units for coordination, management, scaling, and deployment. In at least one embodiment, by associating applications from deployment pipeline(s) 1210 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1212 and application orchestration system 1228. In at least one embodiment, so long as an expected input and/or output of each container or application is known by a system (e.g., based on constructs of applications or containers), application orchestration system 1228 and/or pipeline manager 1212 may facilitate communication among and between, and sharing of resources among and between, each of applications or containers. In at least one embodiment, because one or more of applications or containers in deployment pipeline(s) 1210 may share same services and resources, application orchestration system 1228 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1228) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1120 leveraged by and shared by applications or containers in deployment system 1106 may include compute services 1216, AI services 1218, visualization services 1220, and/or other service types. In at least one embodiment, applications may call (e.g., execute) one or more of services 1120 to perform processing operations for an application. In at least one embodiment, compute services 1216 may be leveraged by applications to perform super-computing or other high-performance computing (HPC) tasks. In at least one embodiment, compute service(s) 1216 may be leveraged to perform parallel processing (e.g., using a parallel computing platform 1230) for processing data through one or more of applications and/or one or more tasks of a single application, substantially simultaneously. In at least one embodiment, parallel computing platform 1230 (e.g., NVIDIA's CUDA) may enable general purpose computing on GPUs (GPGPU) (e.g., GPUs 1222). In at least one embodiment, a software layer of parallel computing platform 1230 may provide access to virtual instruction sets and parallel computational elements of GPUs, for execution of compute kernels. In at least one embodiment, parallel computing platform 1230 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1230 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1218 may be leveraged to perform inferencing services for executing machine learning model(s) associated with applications (e.g., tasked with performing one or more processing tasks of an application). In at least one embodiment, AI services 1218 may leverage AI system 1224 to execute machine learning model(s) (e.g., neural networks, such as CNNs) for segmentation, reconstruction, object detection, feature detection, classification, and/or other inferencing tasks. In at least one embodiment, applications of deployment pipeline(s) 1210 may use one or more of output models 1116 from training system 1104 and/or other models of applications to perform inference on imaging data. In at least one embodiment, two or more examples of inferencing using application orchestration system 1228 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1228 may distribute resources (e.g., services 1120 and/or hardware 1122) based on priority paths for different inferencing tasks of AI services 1218.

In at least one embodiment, shared storage may be mounted to AI services 1218 within system 1200. In at least one embodiment, shared storage may operate as a cache (or other storage device type) and may be used to process inference requests from applications. In at least one embodiment, when an inference request is submitted, a request may be received by a set of API instances of deployment system 1106, and one or more instances may be selected (e.g., for best fit, for load balancing, etc.) to process a request. In at least one embodiment, to process a request, a request may be entered into a database, a machine learning model may be located from model registry 1124 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1212) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<8 min). In at least one embodiment, model execution times may be measured from requesting institution or entity and may include partner network traversal time, as well as execution on an inference service.

In at least one embodiment, transfer of requests between services 1120 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1226, and an inference service may perform inferencing on a GPU.

In at least one embodiment, visualization services 1220 may be leveraged to generate visualizations for viewing outputs of applications and/or deployment pipeline(s) 1210. In at least one embodiment, GPUs 1222 may be leveraged by visualization services 1220 to generate visualizations. In at least one embodiment, rendering effects, such as ray-tracing, may be implemented by visualization services 1220 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1220 may include an internal visualizer, cinematics, and/or other rendering or image processing capabilities or functionality (e.g., ray tracing, rasterization, internal optics, etc.).

In at least one embodiment, hardware 1122 may include GPUs 1222, AI system 1224, cloud 1226, and/or any other hardware used for executing training system 1104 and/or deployment system 1106. In at least one embodiment, GPUs 1222 (e.g., NVIDIA's TESLA and/or QUADRO GPUs) may include any number of GPUs that may be used for executing processing tasks of compute services 1216, AI services 1218, visualization services 1220, other services, and/or any of features or functionality of software 1118. For example, with respect to AI services 1218, GPUs 1222 may be used to perform pre-processing on imaging data (or other data types used by machine learning models), post-processing on outputs of machine learning models, and/or to perform inferencing (e.g., to execute machine learning models). In at least one embodiment, cloud 1226, AI system 1224, and/or other components of system 1200 may use GPUs 1222. In at least one embodiment, cloud 1226 may include a GPU-optimized platform for deep learning tasks. In at least one embodiment, AI system 1224 may use GPUs, and cloud 1226—or at least a portion tasked with deep learning or inferencing—may be executed using one or more AI systems 1224. As such, although hardware 1122 is illustrated as discrete components, this is not intended to be limiting, and any components of hardware 1122 may be combined with, or leveraged by, any other components of hardware 1122.

In at least one embodiment, AI system 1224 may include a purpose-built computing system (e.g., a super-computer or an HPC) configured for inferencing, deep learning, machine learning, and/or other artificial intelligence tasks. In at least one embodiment, AI system 1224 (e.g., NVIDIA's DGX) may include GPU-optimized software (e.g., a software stack) that may be executed using a plurality of GPUs 1222, in addition to DPUs, CPUs, RAM, storage, and/or other components, features, or functionality. In at least one embodiment, one or more AI systems 1224 may be implemented in cloud 1226 (e.g., in a data center) for performing some or all of AI-based processing tasks of system 1200.

In at least one embodiment, cloud 1226 may include a GPU-accelerated infrastructure (e.g., NVIDIA's NGC) that may provide a GPU-optimized platform for executing processing tasks of system 1200. In at least one embodiment, cloud 1226 may include an AI system(s) 1224 for performing one or more of AI-based tasks of system 1200 (e.g., as a hardware abstraction and scaling platform). In at least one embodiment, cloud 1226 may integrate with application orchestration system 1228 leveraging multiple GPUs to enable seamless scaling and load balancing between and among applications and services 1120. In at least one embodiment, cloud 1226 may tasked with executing at least some of services 1120 of system 1200, including compute services 1216, AI services 1218, and/or visualization services 1220, as described herein. In at least one embodiment, cloud 1226 may perform small and large batch inference (e.g., executing NVIDIA's TENSOR RT), provide an accelerated parallel computing API and platform 1230 (e.g., NVIDIA's CUDA), execute application orchestration system 1228 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1200.

FIG. 13A illustrates a data flow diagram for a process 1300 to train, retrain, or update a machine learning model, in accordance with at least one embodiment. In at least one embodiment, process 1300 may be executed using, as a non-limiting example, system 1200 of FIG. 12. In at least one embodiment, process 1300 may leverage services 1120 and/or hardware 1122 of system 1200, as described herein. In at least one embodiment, refined models 1312 generated by process 1300 may be executed by deployment system 1106 for one or more containerized applications in deployment pipelines 1210.

In at least one embodiment, model training 1114 may include retraining or updating an initial model 1304 (e.g., a pre-trained model) using new training data (e.g., new input data, such as customer dataset 1306, and/or new ground truth data associated with input data). In at least one embodiment, to retrain, or update, initial model 1304, output or loss layer(s) of initial model 1304 may be reset, or deleted, and/or replaced with an updated or new output or loss layer(s). In at least one embodiment, initial model 1304 may have previously fine-tuned parameters (e.g., weights and/or biases) that remain from prior training, so training or retraining 1114 may not take as long or require as much processing as training a model from scratch. In at least one embodiment, during model training 1114, by having reset or replaced output or loss layer(s) of initial model 1304, parameters may be updated and re-tuned for a new data set based on loss calculations associated with accuracy of output or loss layer(s) at generating predictions on new, customer dataset 1306 (e.g., image data 1108 of FIG. 11).

In at least one embodiment, pre-trained models 1206 may be stored in a data store, or registry (e.g., model registry 1124 of FIG. 11). In at least one embodiment, pre-trained models 1206 may have been trained, at least in part, at one or more facilities other than a facility executing process 1300. In at least one embodiment, to protect privacy and rights of patients, subjects, or clients of different facilities, pre-trained models 1206 may have been trained, on-premise, using customer or patient data generated on-premise. In at least one embodiment, pre-trained models 1206 may be trained using cloud 1226 and/or other hardware 1122, but confidential, privacy protected patient data may not be transferred to, used by, or accessible to any components of cloud 1226 (or other off premise hardware). In at least one embodiment, where a pre-trained model 1206 is trained at using patient data from more than one facility, pre-trained model 1206 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1206 on-premise and/or off premise, such as in a datacenter or other cloud computing infrastructure.

In at least one embodiment, when selecting applications for use in deployment pipelines 1210, a user may also select machine learning models to be used for specific applications. In at least one embodiment, a user may not have a model for use, so a user may select a pre-trained model 1206 to use with an application. In at least one embodiment, pre-trained model 1206 may not be optimized for generating accurate results on customer dataset 1306 of a facility of a user (e.g., based on patient diversity, demographics, types of medical imaging devices used, etc.). In at least one embodiment, prior to deploying pre-trained model 1206 into deployment pipeline 1210 for use with an application(s), pre-trained model 1206 may be updated, retrained, and/or fine-tuned for use at a respective facility.

In at least one embodiment, a user may select pre-trained model 1206 that is to be updated, retrained, and/or fine-tuned, and pre-trained model 1206 may be referred to as initial model 1304 for training system 1104 within process 1300. In at least one embodiment, customer dataset 1306 (e.g., imaging data, genomics data, sequencing data, or other data types generated by devices at a facility) may be used to perform model training 1114 (which may include, without limitation, transfer learning) on initial model 1304 to generate refined model 1312. In at least one embodiment, ground truth data corresponding to customer dataset 1306 may be generated by training system 1104. In at least one embodiment, ground truth data may be generated, at least in part, by clinicians, scientists, doctors, practitioners, at a facility (e.g., as labeled clinic data 1112 of FIG. 11).

In at least one embodiment, AI-assisted annotation 1110 may be used in some examples to generate ground truth data. In at least one embodiment, AI-assisted annotation 1110 (e.g., implemented using an AI-assisted annotation SDK) may leverage machine learning models (e.g., neural networks) to generate suggested or predicted ground truth data for a customer dataset. In at least one embodiment, user 1310 may use annotation tools within a user interface (a graphical user interface (GUI)) on computing device 1308.

In at least one embodiment, user 1310 may interact with a GUI via computing device 1308 to edit or fine-tune (auto) annotations. In at least one embodiment, a polygon editing feature may be used to move vertices of a polygon to more accurate or fine-tuned locations.

In at least one embodiment, once customer dataset 1306 has associated ground truth data, ground truth data (e.g., from AI-assisted annotation, manual labeling, etc.) may be used by during model training 1114 to generate refined model 1312. In at least one embodiment, customer dataset 1306 may be applied to initial model 1304 any number of times, and ground truth data may be used to update parameters of initial model 1304 until an acceptable level of accuracy is attained for refined model 1312. In at least one embodiment, once refined model 1312 is generated, refined model 1312 may be deployed within one or more deployment pipelines 1210 at a facility for performing one or more processing tasks with respect to medical imaging data.

In at least one embodiment, refined model 1312 may be uploaded to pre-trained models 1206 in model registry 1124 to be selected by another facility. In at least one embodiment, his process may be completed at any number of facilities such that refined model 1312 may be further refined on new datasets any number of times to generate a more universal model.

FIG. 13B is an example illustration of a client-server architecture 1332 to enhance annotation tools with pre-trained annotation models, in accordance with at least one embodiment. In at least one embodiment, AI-assisted annotation tools 1336 may be instantiated based on a client-server architecture 1332. In at least one embodiment, annotation tools 1336 in imaging applications may aid radiologists, for example, identify organs and abnormalities. In at least one embodiment, imaging applications may include software tools that help user 1310 to identify, as a non-limiting example, a few extreme points on a particular organ of interest in raw images 1334 (e.g., in a 3D MRI or CT scan) and receive auto-annotated results for all 2D slices of a particular organ. In at least one embodiment, results may be stored in a data store as training data 1338 and used as (for example and without limitation) ground truth data for training. In at least one embodiment, when computing device 1308 sends extreme points for AI-assisted annotation 1110, a deep learning model, for example, may receive this data as input and return inference results of a segmented organ or abnormality. In at least one embodiment, pre-instantiated annotation tools, such as AI-Assisted Annotation Tool 1336B in FIG. 13B, may be enhanced by making API calls (e.g., API Call 1344) to a server, such as an Annotation Assistant Server 1340 that may include a set of pre-trained models 1342 stored in an annotation model registry, for example. In at least one embodiment, an annotation model registry may store pre-trained models 1342 (e.g., machine learning models, such as deep learning models) that are pre-trained to perform AI-assisted annotation on a particular organ or abnormality. These models may be further updated by using training pipelines 1204. In at least one embodiment, pre-installed annotation tools may be improved over time as new labeled clinic data 1112 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    receiving, using a processing device, a first intermediate representation of a first portion of a source code implementing an application;
    receiving a second intermediate representation of a second portion of the source code;
    merging, at run-time, the first intermediate representation and the second intermediate representation into a merged intermediate representation, wherein the first intermediate representation includes a reference to a function in the second intermediate representation;

identifying, based on a run-time value of a parameter of the application, a flow transfer instruction within the merged intermediate representation, wherein the flow transfer instruction references the function;

identifying, within the merged intermediate representation, a set of executable instructions implementing the function; and replacing the flow transfer instruction with a copy of the set of executable instructions implementing the function.

2. The method of claim 1, further comprising:
executing the merged intermediate representation using the processing device.

3. The method of claim 2, wherein executing the merged intermediate representation on the device includes transforming the merged intermediate representation into a set of executable instructions and caching at least part of the set of executable instructions corresponding to the merged intermediate representation into the device.

4. The method of claim 1, wherein at least one of the first intermediate representation or the second intermediate representation is generated using a compiler before run-time.

5. The method of claim 1, wherein at least one of the first intermediate representation or the second intermediate representation is generated using a compiler, prior to merging, at run-time.

6. The method of claim 1, wherein receiving the first intermediate representation and the second intermediate representation includes storing the first intermediate representation and the second intermediate representation in the processing device.

7. The method of claim 1, wherein at least one of the receiving, the merging, the identifying, or the replacing is performed using an application programming interface (API) exposed to the processing device.

8. A system comprising:
one or more processing units to:
receive a first intermediate representation of a first portion of a source code implementing an application;
receive a second intermediate representation of a second portion of the source code;
merge, at run-time, the first intermediate representation and the second intermediate representation into a merged intermediate representation, wherein the first intermediate representation includes a reference to a function in the second intermediate representation;
identify, based on a run-time value of a parameter of the application, a flow transfer instruction within the merged intermediate representation, wherein the execution flow transfer instruction references the function;
identify, within the intermediate merged representation, a set of executable instructions implementing the function; and
replace the flow transfer instruction with a copy of the set of executable instructions implementing the function.

9. The system of claim 8, wherein the one or more processing units are further to:
execute the merged intermediate representation using the processing device.

10. The system of claim 9, wherein executing the merged intermediate representation on the device includes transforming the merged intermediate representation into a set of executable instructions and caching at least part of the set of executable instructions corresponding to the merged intermediate representation using the device.

11. The system of claim 8, wherein at least one of the first intermediate representation or the second intermediate representation is generated using a compiler before run-time.

12. The system of claim 8, wherein at least one of the first intermediate representation or the second intermediate representation is generated using a compiler, prior to merging, at run-time.

13. The system of claim 8, wherein receiving the first intermediate representation and the second intermediate representation includes storing the first intermediate representation and the second intermediate representation using the processing device.

14. The system of claim 8, wherein the at least one of receiving, the merging, the identifying, or the replacing is performed using an application programming interface (API) exposed to the processing device.

15. A non-transitory computer-readable storage medium comprising instructions that, when executed by a processing device, cause the processing device to perform operations comprising:
identifying, based on a run-time value of a parameter of an application, a first intermediate representation of a merged intermediate representation referencing a function in a second intermediate representation of the merged intermediate representation;
identifying, within the merged intermediate representation, a set of executable instructions implementing the function, the set of executable instructions comprising a flow transfer function; and
replacing the execution flow transfer instruction with a copy of the set of executable instructions implementing the function.

16. The non-transitory computer-readable storage medium of claim 15, wherein the one or more processing units further:
execute the merged intermediate representation on the device.

17. The non-transitory computer-readable storage medium of claim 16, wherein executing the merged intermediate representation on the device includes compiling the merged intermediate representation into native machine code of the device and caching the native machine code corresponding to the merged intermediate representation using the device.

18. The non-transitory computer-readable storage medium of claim 15, wherein at least one of the first intermediate representation or the second intermediate representation is generated using a compiler at compile time.

19. The non-transitory computer-readable storage medium of claim 15, wherein at least one of the first intermediate representation or the second intermediate representation is generated using a compiler, prior to merging, at run-time.

20. The non-transitory computer-readable storage medium of claim 15, wherein receiving the first intermediate representation and the second intermediate representation includes storing the first intermediate representation and the second intermediate representation using the processing device.

* * * * *

UNITED STATES PATENT AND TRADEMARK OFFICE
CERTIFICATE OF CORRECTION

| | |
|---|---|
| PATENT NO. | : 11,972,281 B2 |
| APPLICATION NO. | : 17/688797 |
| DATED | : April 30, 2024 |
| INVENTOR(S) | : Michael Murphy et al. |

It is certified that error appears in the above-identified patent and that said Letters Patent is hereby corrected as shown below:

On the Title Page

Item (72), delete "Shandeep Nagori" and insert -- Sandeep Nagori --

Signed and Sealed this
Tenth Day of September, 2024

Katherine Kelly Vidal
*Director of the United States Patent and Trademark Office*